(12) United States Patent
Tigera

(10) Patent No.: US 6,486,481 B1
(45) Date of Patent: Nov. 26, 2002

(54) VIBRATORY TABLE APPARATUS AND ASSOCIATED EQUIPMENT AND METHODS FOR RADIATION TREATMENT OF POLYMERIC MATERIALS

(75) Inventor: Arturo Geraldo Tigera, Belle Mead, NJ (US)

(73) Assignee: Ausimont USA, Inc., Thorofare, NJ (US)

(*) Notice: Subject to any disclaimer, the term of this patent is extended or adjusted under 35 U.S.C. 154(b) by 0 days.

(21) Appl. No.: 09/439,017

(22) Filed: Nov. 12, 1999

(51) Int. Cl.⁷ ............................................... H01J 37/30
(52) U.S. Cl. ..................................... 250/492.3; 250/435
(58) Field of Search ............................. 250/492.3, 435, 250/400

(56) References Cited

U.S. PATENT DOCUMENTS

| | | |
|---|---|---|
| 1,451,272 A | 4/1923 | Robinson |
| 2,763,516 A | 9/1956 | Brooke et al. |
| 2,781,038 A | 3/1957 | Schneider |
| 2,794,686 A | 6/1957 | Anselman et al. |
| 2,834,059 A | 5/1958 | Hoelzel |
| 2,921,006 A | 1/1960 | Schmitz et al. |
| 3,081,485 A | 3/1963 | Steigerwald |
| 3,117,821 A | 1/1964 | Mylting |
| 3,224,814 A | 12/1965 | Fisher |
| 3,380,783 A | 4/1968 | Hunter |
| 3,464,740 A | 9/1969 | Scruby et al. |
| 3,766,031 A | 10/1973 | Dillon |
| 3,780,305 A | 12/1973 | Free |
| 4,029,870 A | 6/1977 | Brown et al. |
| 4,036,718 A | 7/1977 | Brown et al. |
| 4,052,278 A | 10/1977 | Brown et al. |
| 4,094,552 A | 6/1978 | Mellor |
| 4,172,776 A | 10/1979 | Singelyn |
| 4,220,511 A | 9/1980 | Derbyshire |
| 4,313,535 A | 2/1982 | Carmichael |
| 4,482,046 A | 11/1984 | Kraus |
| 4,554,941 A | 11/1985 | Coon et al. |
| 4,685,843 A | 8/1987 | Kelm |
| 4,748,005 A | 5/1988 | Neuberg et al. |
| 4,777,192 A | 10/1988 | Neuberg et al. |
| 4,844,236 A | 7/1989 | Kraus |
| 4,976,288 A | 12/1990 | Steele et al. |
| 5,020,943 A | 6/1991 | Filipelli |
| 5,054,966 A | 10/1991 | Filippelli |
| 5,147,727 A | 9/1992 | Liu et al. |
| 5,149,229 A | 9/1992 | Gericke et al. |
| 5,296,113 A | 3/1994 | Luniewski |
| 5,311,027 A | 5/1994 | Schuetz |
| 5,722,802 A | 3/1998 | March |
| 5,801,387 A * | 9/1998 | Nable et al. .............. 250/492.3 |
| 5,856,675 A | 1/1999 | Ivanovich et al. |
| 5,968,997 A | 10/1999 | Luniewski et al. |
| 6,110,318 A * | 8/2000 | Goodman ................. 156/272.2 |

* cited by examiner

*Primary Examiner*—Jack Berman
*Assistant Examiner*—Anthony Quash
(74) *Attorney, Agent, or Firm*—Norris, McLaughlin & Marcus

(57) ABSTRACT

Apparatus and a method for treating polymeric material, such as polytetrafluoroethylene, with radiation. The polytetrafluoroethylene is moved under an electron beam in an even and consistent depth on an adapted vibratory table. The vibratory table is sealably covered which allows a controlled environment. The polymeric material can be degraded to lower molecular weight forms or reacted with other materials.

27 Claims, 16 Drawing Sheets

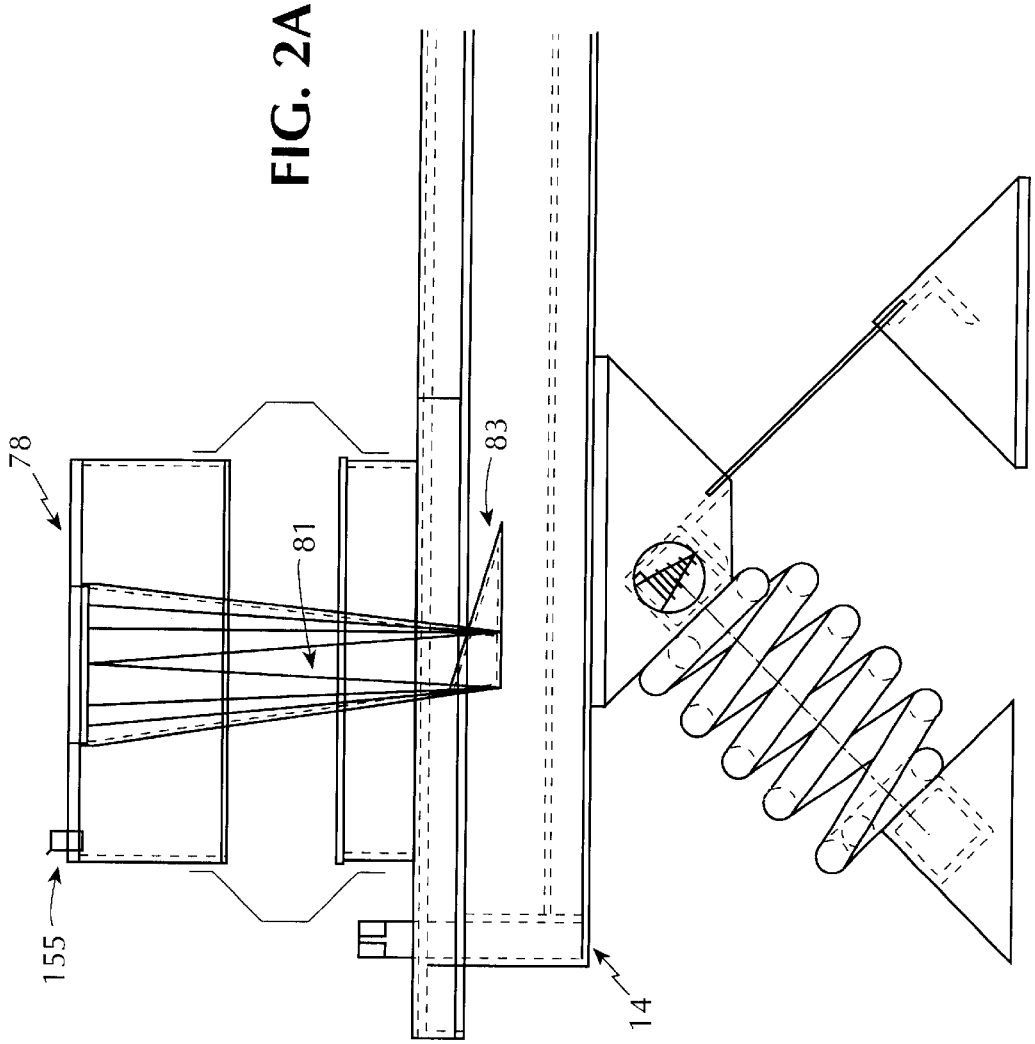

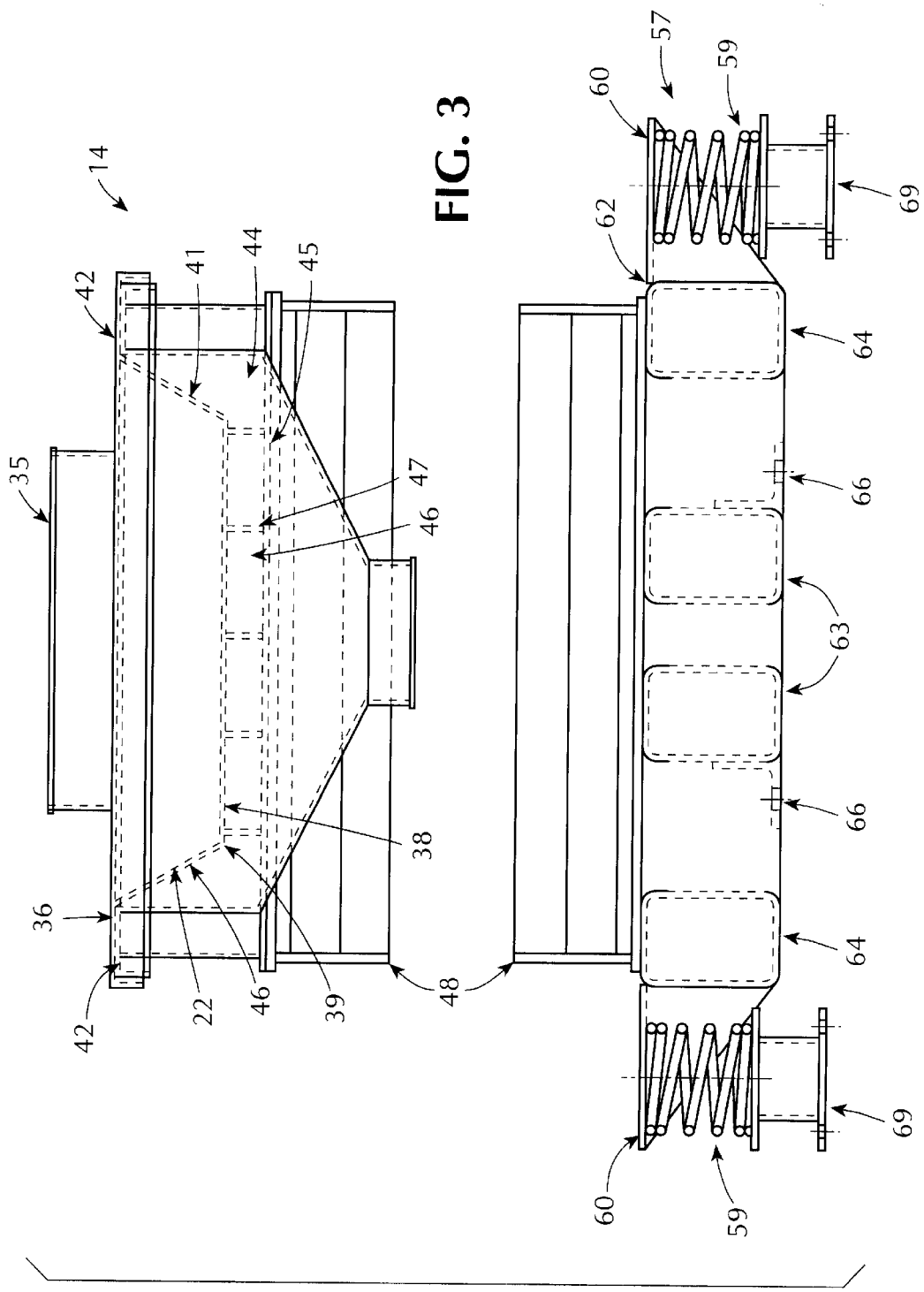

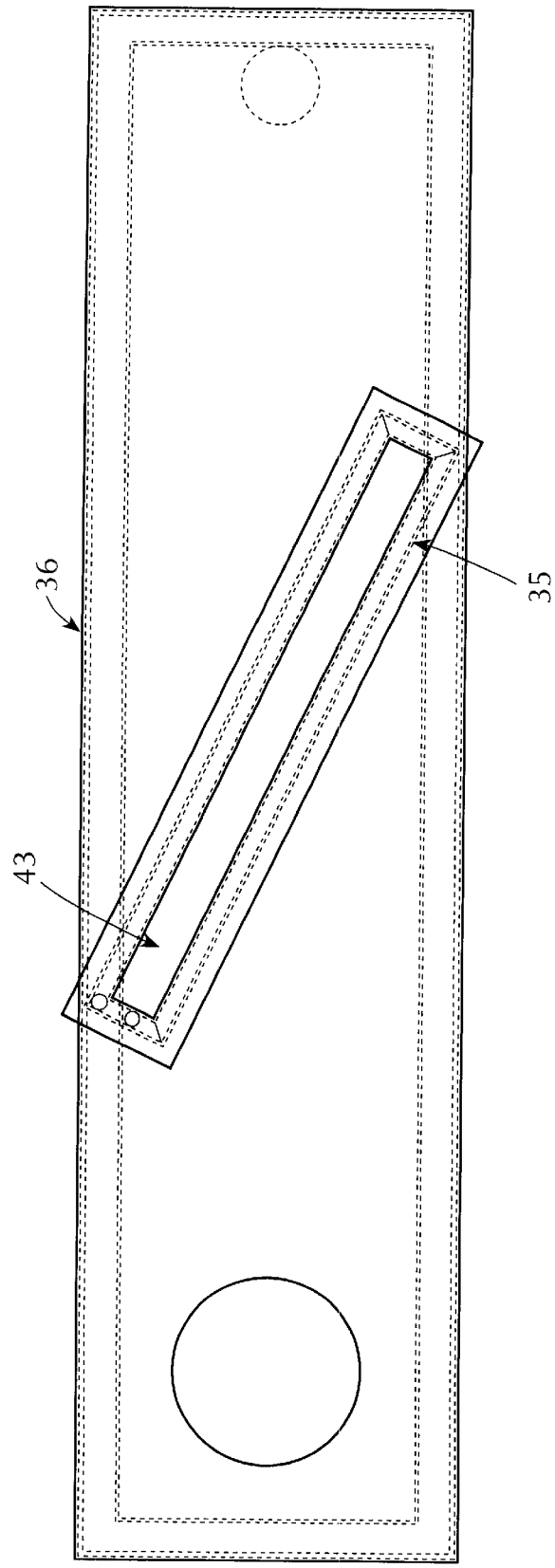

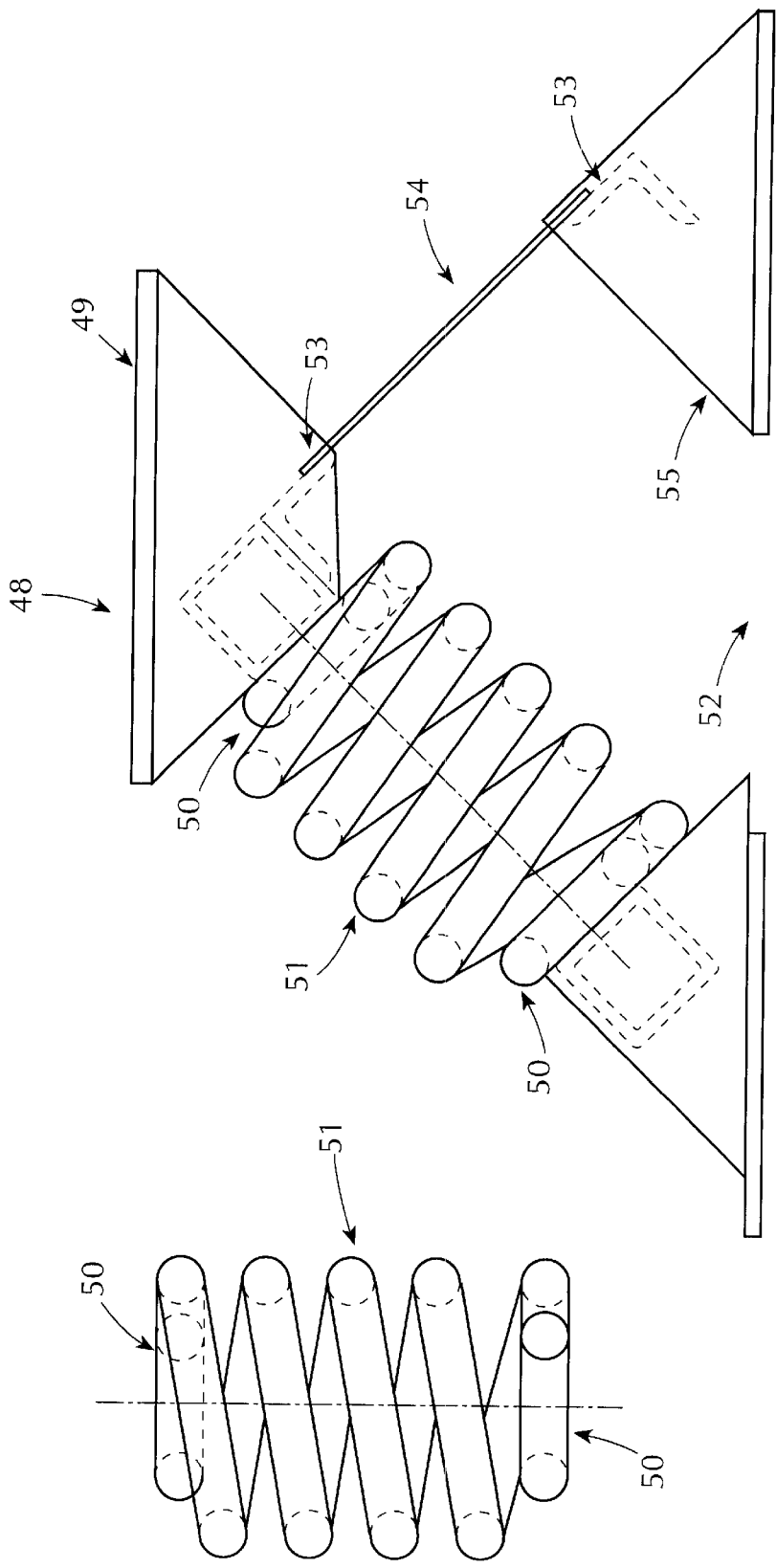

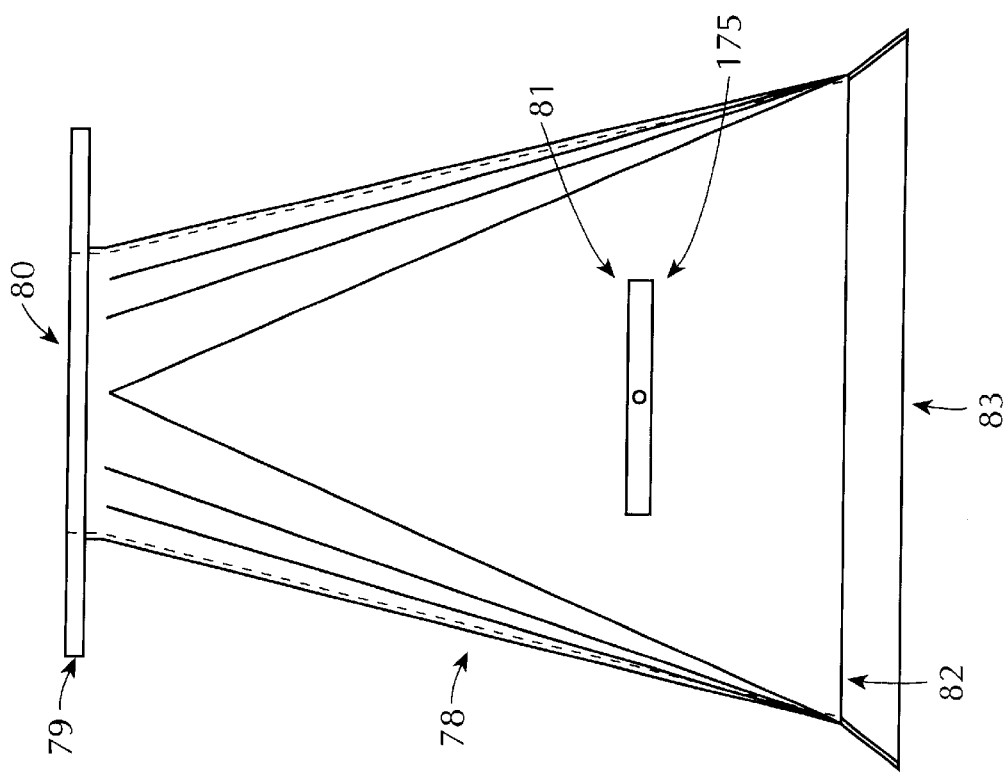
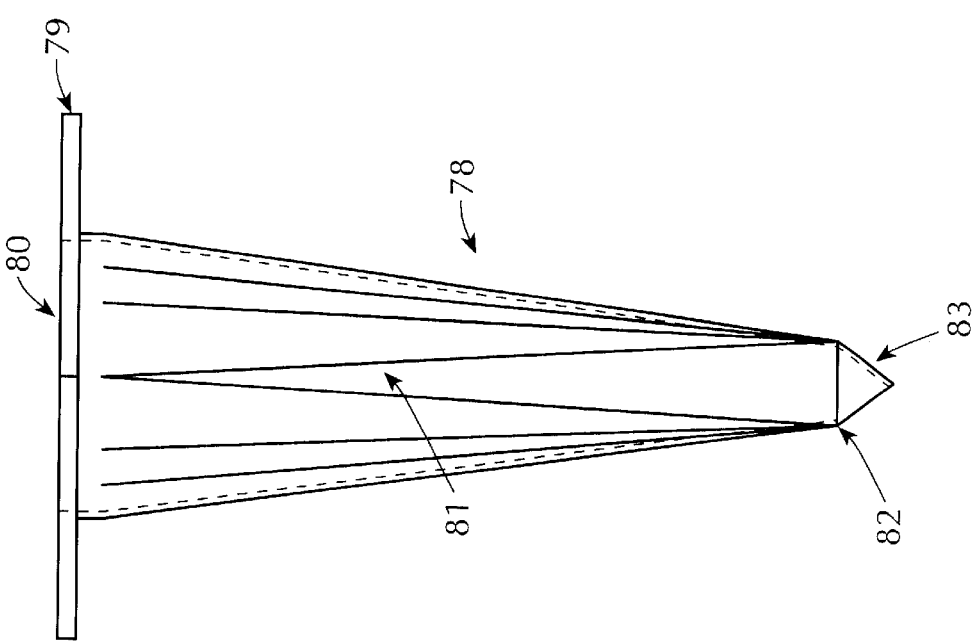

VIBRATORY TABLE APPARATUS AND ASSOCIATED EQUIPMENT AND METHODS FOR RADIATION TREATMENT OF POLYMERIC MATERIALS

BACKGROUND OF THE INVENTION

1. Field of the Invention

The invention involves radiation treatment of polymeric materials, including treatment of polytetrafluoroethylene ("PTFE") to degrade the material into lower molecular weight forms. That is the electron beam degrades the molecular chain of the polymer thereby reducing the molecular weight. More specifically, the invention has to do with the use a vibratory table to move polymer, such as PTFE, in an even layer, that is at a consistent thickness or depth under an electron beam. The vibratory table apparatus and methods in accordance with the present invention accomplish several desired improvements over apparatus and methods known in the art, and resolves certain deficiencies associated with radiation treatment, particularly radiation treatment of fluoropolymers such as PTFE. The apparatus and methods provide an even layer of material on a continuous basis under an electron beam which allows for more efficient processing without radiation losses and labor requirements of other processes, provides for an enclosed environment which protects against gas evolution and provides for continuous cooling. These and other advantages over radiation process known in the art are achieved with the apparatus and methods of the invention as described herein.

The polymeric material is treated in an enclosed environment which permits treatment to be performed in dedicated environments, including an inert environment and environments rich in particular gases, such as oxygen and nitrogen, or combinations of gases. This feature of the invention allows the apparatus and process to be adapted to permit reaction between materials on the table and chemicals permitted to enter the environment where the radiation treatment occurs. The method can also be adapted to combine at least two materials on the vibratory table to allow for a reaction or reactive coating, such as copolymerization, between the materials using the energy of the electron beam. The apparatus comprises a dual loop cooling water system which provides for the efficient removal of the significant heat generated during the radiation processing, and other cooling systems dedicated to other pieces of apparatus used in the process. The material can be delivered to the vibratory table by any means capable of transporting polymer materials, including a pneumatic flow system, and any means capable of transporting polymer materials, including a pneumatic flow system, can be used to convey treated material from the area of the vibratory table. The radiation processing can embrittle the polymeric material due to molecular wright degradation thus facilitating the physical breaking of the treated polymers in the pneumatic flow system to allow for the reduction in material particle size. Use of a pneumatic flow system with the vibratory table provides for the reduction of the particle size of the polymeric material to about 30 to about 3,000 microns.

2. The Related Art

Radiation treatment has been employed to polymerize organic substances and for treatment of polymers. For example, U.S. Pat. No. 2,921,006 to Schmitz et al. describes polymerization of monomers with an electron beam which is exposed to the monomer in a vacuum chamber partially filled with a cooling medium. An embodiment of the invention in U.S. Pat. No. 2,921,006 involves the continuous treatment of monomer moved through the electron beam on a thin sheet of stainless steel, about 0.002 inches thick, with side flanges of resilient material to prevent material dropping off the sides of the sheet. This patent does not involve the degradation of polymer and does not address process concerns and parameters pertinent to polymeric degradation with an electron beam, and particularly degradation of PTFE.

U.S. Pat. No. 3,081,485 to Steigerwald involves treatment of thermoplastic strands which have softening points below their decomposition points. The strands are moved through an electron beam in a vacuum chamber to soften the thermoplastic. U.S. Pat. No. 5,856,675 to Ivanovich et al. concerns the movement of polymer, on a continuous basis using a conveyor system through an electron beam to cross-link the material.

Radiation can be used to degrade the molecular weight of polymers such as PTFE. For example, U.S. Pat. No. 3,766,031 to Dillon discusses radiation treatment of PTFE with an electron beam at between about 5 and 25 Mrads which renders the PTFE capable of being comminuted to microfineness. This comminuted PTFE is useful as a dry lubricant, for example, in paints and inks. The process employed in U.S. Pat. No. 3,766,031 is not efficient and not appropriate for modern processing because there is no method for cooling the PTFE and the PTFE is unevenly treated. U.S. Pat. No. 4,220,511 to Derbyshire discusses the degradation of unsintered PTFE to be ground into a powder with an average size less than 10 microns. A combination of a radiation at 50–150 Mrads and heat at 150° F. to 600° F. for approximately one half hour is used in the process to degrade the PTFE. U.S. Pat. No. 4,029,870 to Brown, et al. discusses dry lubricant PTFE obtained by subjecting the PTFE to γ-radiation at doses of between 2 and 20 Mrads and subsequently comminuting the PTFE to microfiness. U.S. Pat. No. 5,891,573 to Nueberg et al. addresses subjecting PTFE handled at a temperature below 66° F. to a radiation source to obtain friable PTFE, and the PTFE may be combined with a wetting agent prior to irradiation.

Conventional methods of treating PTFE with electron beams, in use today, including those involving the use of trays are inefficient and results in PTFE products that are unevenly treated. The conventional methods result in uneven radiation treatment, and experiences other deficiencies, including the inability to control the processing environment, process gas evolution and the inability to effectively remove heat.

Several factors contribute to the inefficiency of tray irradiation of PTFE. The most significant occurs as a result of the beam penetration characteristics through the depth of material in the tray. Typically, the dose at the surface is taken as the nominal dose for the material. Beam energy and/or material depth is adjusted so that an equal dose is effected at the opposite surface of the material. Radiation which passes entirely through the product is not utilized. Radiation in excess of the nominal dose is likewise not used. This causes inefficiency, and in some instances may result in undesired properties of the resultant product. This depth-dose characteristic can cause processing inefficiency of up to 50%. Variations in material depth in the tray, gaps between the trays, and overscan of the tray, which is necessary to assure complete and uniform irradiation, can cause additional inefficiencies of approximately 5–15%.

The depth-dose characteristic, overscan and variations in material depth that occurs with tray processing all contribute to uneven treatment of the PTFE. Consequently, some of the PTFE may be overly treated and other portions of the PTFE may not receive adequate treatment. This results in inconsistent properties and, hence, unpredictable product quality of the processed PTFE.

Processing on trays can only be performed in batches requiring time and labor to place material on the tray and move trays into position and from the processing area after treatment. This requires that a human being be so integrally involved in the process that processing is generally performed in ambient conditions. Thus, the conventional tray process is limited in the inability to effectively control the environment where the processing occurs, and the process cannot be readily adapted to allow for reaction between PTFE and other materials, or to react or combine polymers in general.

Hydrogen fluoride gas generation from radiation treatment of fluoropolymers, such as PTFE, is a problem associated with the tray method and other known processes for degradation of fluoropolymers such as PTFE with an electron beam. Presence of hydrogen fluoride gas presents worker safety and environmental control issues. As discussed below, the hydrogen fluoride gas will interact with steam or condensed water resulting from cooling water methods which results in generation of hydrofluoric acid that not only causes additional worker safety issues and environmental control issues, but causes potential corrosion of equipment.

Radiation treatment of PTFE generates large amounts of heat and successful industrial processes for treatment of PTFE require removal of the thermal energy due to the electron beam from the processing area. The tray method is limited because, as in U.S. Pat. No. 3,766,031, there is no provision for heat transfer.

When methods of heat transfer such as direct cooling of the PTFE or water jackets are applied in conventional radiation processes, these methods are generally inefficient and have serious drawbacks. A conventional method for cooling during tray processing is applying water directly to the PTFE. As discussed above, the hydrogen fluoride gas generated from the electron beam treatment of the PTFE reacts with the cooling water to form caustic hydrofluoric acid. Besides the previously discussed health, safety, and corrosion issues caused by hydrofluoric acid, the direct cooling method generates an acidic waste stream which may require treatment or special considerations for disposal and other environmental controls. The hydrofluoric acid is caustic and this can corrode the apparatus and equipment used in the PTFE treatment process and gives rise to worker health and safety issues. Direct cooling of PTFE with water also inhibits the degradation process, preventing proper degradation of the PTFE and resulting in an inferior product.

Another method to remove heat during PTFE radiation treatment is the use of cooling water jackets. Use of conventional cooling water jackets to remove heat during PTFE radiation treatment generally require large volumes of water to effectively remove the vast amounts of heat generated in the process. Thus, cooling water jackets require large amounts of water resources which add to the costs and material requirements for PTFE processing. Also, during the cooling process with a water jacket, condensation can form during cooling which can mix with the hydrogen fluoride gas to form caustic hydrofluoric acid. As discussed above, hydrofluoric acid gives rise to wastes, such an acidic waste stream that may require special treatment or considerations for disposal and other environmental controls, corrosion of the apparatus and equipment and worker health and safety issues.

One method employed to inhibit hydrofluoric acid production, during the cooling process with a cooling jacket, is to heat the water to a temperature above the dew point of the gas in the surrounding environment to avoid condensation. This, however, reduces the heat transfer capabilities of the water thereby requiring larger amounts of water than cooling processes that do not require heated water. Furthermore, in order to elevate the temperature of the water, water to water heat exchangers may be necessary adding complexity to the process and equipment combined with additional capital and operating costs.

Efforts have been made to develop processes that provide for more even radiation treatment of PTFE to avoid the problems associated with the tray method and to avoid the traditional drawbacks associated with cooling systems. An apparatus and method for degrading PTFE by propelling the polymer in a fluidized bed of hot air into the path of an electron beam is disclosed in U.S. Pat. No. 5,296,113 to Luniewski. The apparatus has a means for generating an electron beam, a chamber where the PTFE interacts with the electron beam and a separator. Heated air at high pressure is injected into the chamber to move the PTFE around the chamber and through the path of the electron beam. The PTFE is said to be degraded to particles with sizes ranging from 10 to 400 microns which then can be use as a dry lubricant. The apparatus relies on direct air cooling of the PTFE during the process, and the apparatus is equipped with cooling water jackets for the bottom of the chamber and an aperture at the top of the chamber where the electron beam enters the chamber. The cooling water jackets are designed to cool the chamber, and not the PTFE, and the apparatus relies on rapid treatment of the PTFE so that the PTFE particles are not affected by the cooling water in the cooling water jackets.

U.S. Pat. No. 5,149,727 to Luniewski describes a method and apparatus for treating and degrading PTFE for use as a dry lubricant which utilizes simultaneous irradiation, grinding, agitation and air cooling. The apparatus has a means for generating an electron beam, and a grinding vessel. The grinding vessel includes air jets which can inject air at up to 200 pounds per square inch ("psi") into the grinding vessel and paddles. The paddles cause the PTFE to move haphazardly into the path of the electron beam in the grinding vessel. The air injection cools the PTFE within the grinding vessel to a temperature below 620° F., the melting point, and also assists in the movement of the particles within the vessel. The PTFE particles are degraded, primarily, by the radiation and grinding action that occurs within the vessel. The air injection alleviates the need for a cooling water system for the apparatus. A classifier attached to the apparatus causes the degraded PTFE particles to exit the grinding vessel when a desired particle size is achieved. The apparatus can treat PTFE on a batch basis in a typical time of four to nine hours and the process appears primarily developed for batch processing although the process is said to be adaptable for a continuous operation.

Movement of PTFE through an electron beam in a ribbon-blender type apparatus is discussed in U.S. Pat. Nos. 4,777,192 and 4,748,005 to Neuberg et al. The apparatus comprises a means for generating an electron beam and a chamber where PTFE is subjected to the electron beam. Material is delivered to the chamber by a screw conveyor. Stirrer paddles are located within the chamber which move the PTFE within the chamber. The chamber is also equipped with means for permitting flow of air into the chamber which tends to provide fluidizing of the PTFE. This facilitates movement of the paddles, promotes PTFE degradation which requires oxygen and aids the cooling process provided by the primary cooling water jacket. The cooling water must be heated prior to entering the cooling water jacket to avoid condensation.

The product resulting from the apparatus and methods described in U.S. Pat. Nos. 4,777,192 and 4,748,005 is said to be of poor quality and the powder particles treated with radiation in the ribbon-blender type apparatus are said to have widely varied sizes. The process is criticized as not cost effective in that particles mechanically comminuted to smaller sizes need less radiation and larger particles do not receive sufficient oxygen during treatment thus affecting the core. The process described in these patents is said to be basically, a batch process and requires large energy expenditures.

It has now been unexpectedly discovered that the molecular weight of polymeric material, such as PTFE, can be effectively degraded on a batch or continuous basis by movement of the material on a specially adapted vibratory table. The vibratory table is adapted to include a means for generating an electron beam, cooling water systems, conduits and means for delivering PTFE to the table so that the material, such as PTFE, moves under the electron beam at an even depth (e.g. consistent thickness) as a result of the combination of the delivery means and vibratory action of the table. The cooling water system is a dual loop system which permits effective heat transfer at the vibratory table within the design requirements of the table. Furthermore, the cooling water is at an initial temperature of about 55° F. to 65° F. which limits condensation, this consequently limits the potential for generation of hydrofluoric acid thus achieving a practical system using a cooling water jacket while alleviating the drawbacks encountered when water jackets are used with conventional and other known methods and apparatus. Also, dry air can be introduced at the trough of the vibratory table which inhibits condensation.

The apparatus and method comprising a vibratory table accomplishes several fundamental improvements over methods and apparatus known in the art. The apparatus and method transports an even layer of material on a continuous basis thus greatly reducing the depth-dose characteristics and other radiation processing inefficiencies associated with known methods, including the tray method; provides for an enclosed environment at the point of treatment which among other benefits protects against gas evolution thereby addressing hydrogen fluoride gas issues associated with known apparatus and methods and provides continuous and effective cooling which minimizes hydrofluoric acid production. When adapted with a pneumatic transport system to deliver material to and from the vibratory table area, the apparatus and process provides the added benefit of reducing the particle size of the material to between about 30 microns and about 3,000 microns.

Movement of material through vibratory action, in general, is known, however the specific concerns pertinent to radiation processing, that is movement of an even layer of material along a vibratory table with effective heat transfer, are not addressed. For example, U.S. Pat. No. 4,313,535 to Carmichael concerns an excited frame, vibratory conveying apparatus. U.S. Pat. No. 4,844,236 to Kraus concerns a vibratory conveying apparatus with a "v-shaped" trough useful for conveying material up an incline. A vibratory conveyor with a flexible trough attached to a spring bed which vibrates causing the flexible bed to flex and change its static shape thus thrusting the material upwards, which is particularly useful for sticky or adhesive materials, is discussed in U.S. Pat. No. 4,482,046 to Kraus. The apparatus in U.S. Pat. No. 4,482,046 can be adapted with a cooling system comprising a cooling jacket beneath the bed of the trough that uses air or water as the cooling medium, and the bed may be perforated with small holes to permit air or water flow and facilitate heat transfer. None of these patents discuss the requirements necessary for a vibratory table to deliver an even layer of material, such as PTFE, under an electron beam, and these patents do not address the criteria necessary for radiation treatment, in particular the removal of the significant heat generated at the vibratory table during radiation processing or cooling systems capable of performing in accordance with the requirements necessary for radiation treatment of fluoropolymers.

It has been unexpectedly discovered that the molecular weight of PTFE can be degraded efficiently and minimizing the problems associated with treatment of PTFE on a tray, and other processes known in the art. The apparatus and method used for the radiation treatment of material, such as PTFE, comprises 1) a vibratory table adapted for radiation treatment in an enclosed environment, 2) a dual loop cooling water system which effectively removes heat from the vibratory table, 3) a means for generating an electron beam, 4) a device that delivers material to the vibratory table which, along with the vibratory action of the table, allows for movement of an even layer of material beneath the electron beam, 5) cooling water systems for other apparatuses used in the method and 6) means to transport the material to the apparatus and to transport treated material from the apparatus to a staging and/or packaging area. The system is preferably operated on a continuous basis.

All percentages set forth herein are, unless otherwise noted, weight by weight percent.

SUMMARY OF THE INVENTION

A method and apparatus are described herein which provides for radiation treatment of material, preferably PTFE, which treatment can be performed on a continuous or batch basis. The material is transported under an electron beam on a vibratory table. The electron beam scans an aperture in a cover on the vibratory table which has a window below which the electron beam breaks the molecular chain of the polymer thereby reducing its molecular weight. The use of a vibratory table, combined with means for delivering material to the table, allows for an even layer of material to be moved under the beam, that is the material retains a consistent thickness as it moves along the vibratory table and under the electron beam. Thus, the radiation dosage can be adjusted to conform to the depth of material on the vibratory table, thereby alleviating the problems and inefficiencies associated with conventional methods and apparatus caused by the depth-dose characteristic, overscan and the need for a nominal dose. The method and apparatus described herein are superior to the tray methods and other known methods of treating polymeric material such as PTFE because the material is moved under the beam on a continuous basis without any gaps and, as such, efficiency losses associated with product gaps during treatment are alleviated. The method and apparatus using the vibratory table results in a degraded polymer product that is superior to those obtained through conventional and other known methods and the degraded polymer product treated on the vibratory table does not have the inconsistent properties and unpredictable product quality associated with degraded polymeric material subjected to radiation treatment by known methods and apparatus. The material processed on the vibratory table will also have better processability than material made with known processes.

The apparatus used in conjunction with the method comprises a system for delivering the material to the apparatus for treatment and a system for removing the material from the apparatus. These systems may be preferably pneumatic, however, any system capable of moving polymers is acceptable. The system for moving material to and from the processing area may be equipped with a separator or classifier that removes from the conveying system larger pieces created from fusion under the electron beam. Such a separator or classifier may also be used to automatically recirculate oversized particles back into the system. In one embodiment, two delivery lines may be co-joined which allows for mixing of polymers or other material in a delivery line so that a blend of polymers are delivered to the vibratory table. This embodiment is particularly useful when a reaction between polymers is desired which requires the energy of the electron beam. As such, the method and apparatus can be used for reactive coating to form co-polymers, including co-polymers comprising PTFE.

The apparatus is equipped with a unique system for delivering material to the vibratory table. PTFE, or other polymers, are placed on the vibratory table through a distribution chute specifically designed to provide even spreading of polymer on the trough of the vibratory table and compensate for pulse release of material from a plug flow rotary valve used to remove the material from a delivery line. In the embodiment involving pneumatic transport of PTFE, for example, PTFE is released from the pneumatic transport system to a plug flow rotary valve which moves the PTFE to the distribution chute. Thus, in this embodiment, the chute both evenly distributes the PTFE on the trough and compensates for the action of the plug flow rotary valve.

The distribution chute, which is in the shape of a hollow cone bisected in half, has a top opening defined by a rim which is half circular in shape and hollow with a diameter preferably about six inches, a hollow open conical section with an open annular space extending downwardly from the top opening to an opening at the bottom of the conical section, a bottom opening, defined by a rim which is hollow and a half circle with a diameter exceeding the diameter of the top opening. The hollow cone shaped distribution chute may be covered. The distribution chute comprises an internal directing plate which can be adjusted to equalize material flow across the trough of the vibratory table. Preferably the diameter of the bottom opening is approximately the size of the width of the bed of the vibratory table. A recessed flap is attached to the end of the distribution chute and extends angularly downward towards the vibratory table. The recessed flap restricts flow thus facilitating even distribution on the trough. Material enters the distribution chute at the top opening and then moves in a downward direction expanding axially to the diameter of the open conical section as the material descends in the conical section. The material leaves the distribution chute through the bottom opening and recessed flap and is thereby placed onto the trough of vibratory table in an even layer, and the vibratory action of the table maintains the even layer (e.g. consistent thickness) as the material passes beneath the electron beam. The distribution chute comprises an internal directing plate which can be adjusted to equalize the flow of material across the trough of the vibratory table. The chute assists in distribution of material as well as provides a continuous flow to the trough of the vibratory table.

The material is subjected to treatment on a vibratory table which comprises a cover that is sealed with the table to allow for control of the environment where the radiation processing occurs. The cover also has an aperture to accommodate a window for the scanning electron beam which allows the energy of the electron beam to interact with the material on the table. The window, which when removably affixed to the cover becomes a component of the cover, functions, in part, to enclose the environment at the point of radiation treatment, such as at the trough of the vibratory table, while allowing the electron beam into the enclosed environment for treatment. Thus, the window may be made of any material that does not significantly resist the transmission of the electron beam. In an embodiment of the invention, the window comprises a titanium sheet and PVC material may be wrapped around the opposite ends of the titanium sheet, with, optionally, a metal or composite frame to provide structural support to the titanium sheet and allow for replacement or change-over of the window. The window may also comprise a plurality of titanium sheets stacked upon one another with two opposite ends with PVC material wrapped around opposite ends of the plurality of titanium sheets and the plurality of titanium sheets may reside within a metal or composite frame to give structural support and provide for ease of change-over or replacement of the window. The window may be equipped with a cooling system.

The electron beam provides energy for treatment of material, such as the degradation of the molecular weight of PTFE and/or reaction of PTFE with other polymers and chemicals. Through degradation the molecular weight of the material is reduced. The vibratory table is capable of flow rates up to about 5,000 pounds of material per hour, such as up to about 2,500 pounds of material per hour. When a pneumatic flow system is used to transport the material to and from the vibratory table, the pneumatic transport combined with the radiation processing which causes embrittlement of the polymer, allows for particle size reduction of the polymer, and the material can be reduced to a particle size of between about 30 microns and about 3,000 microns in single or multiple passes beneath the beam.

The vibratory table is adapted to accommodate a means for generating an electron beam. The electron beam can be generated by a particle accelerator which energizes and accelerates electrons which are then focused into a beam and directed by a scan horn to the window at an aperture in the cover of the vibratory table. A turbo vacuum pump creates a vacuum for the accelerator and electron beam. The beam moves through the window and into the path of the material as it moves on the bed of the vibratory table under the window thus causing the degradation of the molecular weight of the material. The radiation dosage is adjusted depending on the depth of material on the bed. For degradation of polymeric material, such as PTFE, the dosage can be about 2 megarads ("Mrads") to about 10 Mrads at a setting of about 1.5 Megavolts ("MeV") with amperage settings of about 5 to about 40 milliamps. However, material depth on the bed can be adjusted depending on the dosage. The depth of material on the bed as the material passes under the electron beam is nearly constant. The material may be at a near even depth, that is a consistent thickness of between about ⅛ inches to about ½ inches, depending on the bulk material density.

The extent of degradation of the molecular weight of the material is a function of the depth of material on the bed of the vibratory table (that is the thickness of the material), the dosage and the size and/or original molecular weight of the material. Thus, to achieve a desired molecular weight of the material, repetitive treatments may be necessary. Through experimentation, the depth of material, radiation dose and number of passes necessary to achieve a desired molecular weight can be determined and thus precise standards developed. When pneumatic transport system is used in conjunction with the radiation processing, the parameters such as depth of material, radiation dose and number of passes through the apparatus to achieve a desired particle size having material of desired molecular weight can be determined. Generally, particle sizes of about 100 microns to about 3,000 microns can be achieved with a single pass through the apparatus with pneumatic transport and from about 30 microns to about 3,000 microns with multiple passes. As such, without extensive product analysis or separation techniques, each time the product, such as PTFE, is treated, the parameters effecting molecular weight degradation can be determined and available for commercial use of the method and apparatus. When equipped with a pneumatic transport system, the parameters affecting particle size reduction may also be determined. Accordingly, the apparatus can be operated on a routine basis without the need for expensive and cumbersome analysis each time material is processed on the table to determine if additional processing is necessary.

A means to comminute the material after radiation processing may also be used to reduce the polymeric material to a desired particle size after radiation processing. For example, the polymeric material may be pulverized by one or more mills or micronized by one or more jet mills.

The material is placed on the trough of the vibratory table through the distribution chute which provides for even distribution of material on the bed. The vibratory table can be slightly inclined at an angle, and, if so, the material is deposited on the table at the inclined end of the table. The process, however, can be operated with the vibratory table in the horizontal position. The incline of the table is particularly helpful with respect to the cooling water system by providing that water will fill the cooling water jacket, and in particular channels within the jacket, while maintaining uninterrupted contact with the underside of the trough of the vibratory table. The material then flows in a forward direction along the trough and under the path of the electron beam. The table is capable of flow rates of up to about 5,000 pounds of material per hour, preferably up to about 2,500 pounds of material per hour. The trough of the vibratory table comprises a bottom and sides protruding at an upward angle from each side edge of the bottom of the trough and flanges that protrude from the sides at an angle of repose about horizontal with reference to the bottom of the trough. The upwardly protruding sides prevent PTFE from falling off the sides of the trough. The trough is preferably stainless steel made of a thin material, preferably no more than about 0.08 inches to about 0.37 inches thick, preferably about 0.125 inches thick. The upper side of the trough, that is the side which holds the material, is highly polished, up to about a 240 grit finish. The thinness of the trough facilitates heat transfer and the polished surface serves to both facilitate heat transfer and reduce friction between the material and trough to allow for smooth movement and maintain the desired even depth of the material on the table.

The electron beam is directed to the window, which is rectangular and is located above the table at approximately the mid-point of the trough, and scans the window. The window may be positioned in any manner at the midpoint of the cover, depending on the size of the scan horn of the particle accelerator, and may be located perpendicular to the direction of material flow or at an angle. The entire table is covered by a cover attached to the flanges and the window is placed into an opening, an aperture, in the cover and the window is attached to the cover. One or a plurality of gaskets, preferably two inch silicone gaskets, frame the material of the window. The window is secured to the cover by a variety of means, including gaskets, frames, welds or any other means, or combination of means, to secure the articles together while maintaining a seal for the enclosed environment. A full face gasket may be located over the silicone gasket to seal the window against a stainless steel plate which is then tightened down to secure the window and plate against the table cover, thus securing the window to the cover.

The material is treated in an enclosed environment. This is accomplished by the cover and attached components which are attached to the vibratory table. The enclosed environment allows for treatment in an infinite number of atmospheric conditions within the enclosed environment at the vibratory table. For example, the treatment can occur in an oxygen rich environment, inert environment or nitrogen rich environment depending on needs and requirements. The enclosed environment also allows for chemical treatment and reaction of the material. The apparatus can easily be adapted to provide for chemical reactions of the polymeric material at the table, such as PTFE, and substances permitted into the atmosphere in the enclosed environment. Generally, oxygen facilitates degradation of PTFE and, as such, a preferred embodiment of the invention is to charge the enclosed environment at the vibratory table with dry air which both facilitates PTFE degradation and inhibits condensation.

The cover, and enclosed environment, also alleviates the problems associated with the generation of hydrogen fluoride gas associated with conventional radiation treatment methods for fluoropolymers, such as PTFE. Because the environment at the treatment area is enclosed, hydrogen fluoride gas cannot migrate from the table thus limiting effects on equipment and limiting worker safety concerns. Also, the vibratory table is located within a vault further limiting the potential for hydrogen fluoride gas migration. The cooling water system, by use of water which enters the system at about 55° F. to 65° F., also inhibits condensation. Furthermore, the controlled environment allows the operators to create conditions which inhibit hydrogen fluoride gas production or condensation within the enclosed environment at the vibratory table. As discussed above, dry air can be used which inhibits condensation. Thus, the enclosed environment at the vibratory table inhibits or alleviates the problems of equipment corrosion, worker safety concerns and environmental control issues arising from hydrogen fluoride generation, and hydrofluoric acid production, that are generally associated with radiation treatment systems for fluoropolymers known in the art, including but not limited to tray methods.

The vibratory table is equipped with a jacket which surrounds the undersides of the bottom and sides of the trough. Cooling water, or other heat transfer fluid media, is a circulated in a continuous closed loop to channels located and in contact with the underside of the trough, including the upwardly protruding sides. The cooling water or other heat transfer media, flows opposite to the direction of material on the vibratory table, which both facilitates heat transfer and allows for gradual water heating which further inhibits the formation of condensation and formation of hydrofluoric acid when PTFE or other fluorinated polymers are treated. The water, or other heat transfer media, is circulated at a flow rate of about 15 to about 25 gallons per minute ("gpm") at pressure about 5 psi to about 7 psi. Heat transferred to the water from the table is removed from the water in the closed loop through a heat exchanger. The heat exchanger uses a heat transfer medium, preferably a mixture of ethylene glycol and water to remove heat from the cooling water. The heat transfer medium, such as ethylene glycol and water, is circulated between the heat exchanger and a chiller in a separate loop, independent of the closed loop for the vibratory table, thus the cooling water system for the vibratory table is a dual loop system. Other pieces of equipment used in the method also have cooling systems, some of which may also use an ethylene glycol and water mixture as a heat transfer medium which can be cooled in the same chiller used to remove heat from the heat transfer medium used for the dual loop system for the vibratory table.

As will be readily understood by one skilled in the art, control equipment appurtenant to the apparatus is necessary for the system to operate. These include, but are not limited to; piping, circulating pumps, valves, blowers, coolers, power sources and filters. Also, the system is controlled from a station which allows the operators to control flow variables with the aid of microprocessors.

In general, material, such as PTFE, is moved to a flake unloader-separator where it is mixed with air, and the material is then fed under gravity to a feed hopper. The material is then transported to a plug flow rotary valve which then allows the material to flow under gravity into the distribution chute. The distribution chute evenly distributes the material onto the trough of the vibratory table and the material moves in the trough under an electron beam. After processing, the material moves to the end of the trough opposite to the distribution chute where it drops under gravity into a finished product hopper. The material exits the finished product hopper through a rotary valve and is then transported from the area of the vibratory table by a second transport system which may be a pneumatic transport system. Finished product may be moved to a packaging crate or returned to the product hopper for further treatment. The process can be adapted to include a separator or classifier that removes from the conveying system larger pieces created from fusion under the electron beam and can also be used to automatically recirculate over-sized particles back into the apparatus.

DESCRIPTION OF THE DRAWINGS

FIG. 2A is a diagram of the distribution chute showing the nipple for injecting gaseous material into the enclosed environment.

FIG. 3 is an end view elevation of the vibratory table.

FIG. 4 is a top view elevation of the vibratory table.

FIG. 5A is a cross-sectional view of a spring of the drive spring assemblies.

FIG. 5B is a front view of a drive spring assembly.

FIG. 6A is a side view of the distribution chute.

FIG. 6B is a front view of the distribution chute.

DETAILED DESCRIPTION OF THE PREFERRED EMBODIMENT

The invention will be described with respect to a preferred embodiment involving the degradation of PTFE. The invention, however, should not be construed as being so limited. As will be apparent to one skilled in the art, the process can be used to degrade the molecular weight of other types of polymeric materials and can also be used for polymerizing materials. Furthermore, the process can be equipped to allow for blending polymers thus reacting PTFE with other polymers or providing a reactive coating for the PTFE and other polymers, such as copolymerization. Also, the enclosed environment at the vibratory table permits reaction between gaseous materials charged into the enclosed environment.

PTFE can be used as a dry lubricant and also can be blended or polymerized with other materials to obtain copolymers capable of being molded or injected into thermoplastics or used as a coating material. PTFE is generally a high molecular weight polymer and, absent degradation, PTFE is not acceptable for use as a dry lubricant or for blending, and cannot easily be polymerized with other polymers, that is the molecular weight degradation of the PTFE aids in processability of the material by the end user. Accordingly, commercially acceptable PTFE must be degraded to lower molecular weights in a manner that does not effect polymer properties and this can be accomplished by radiation treatment. The invention provides a method and apparatus that efficiently degrades PTFE to commercially useable molecular weights, while overcoming problems and drawbacks associated with other methods and the inferior quality of the degraded materials that result from the other known methods. When a pneumatic transport system is used, the process provides the additional commercial benefit of reducing the particle size of the polymeric material.

Figure 1:
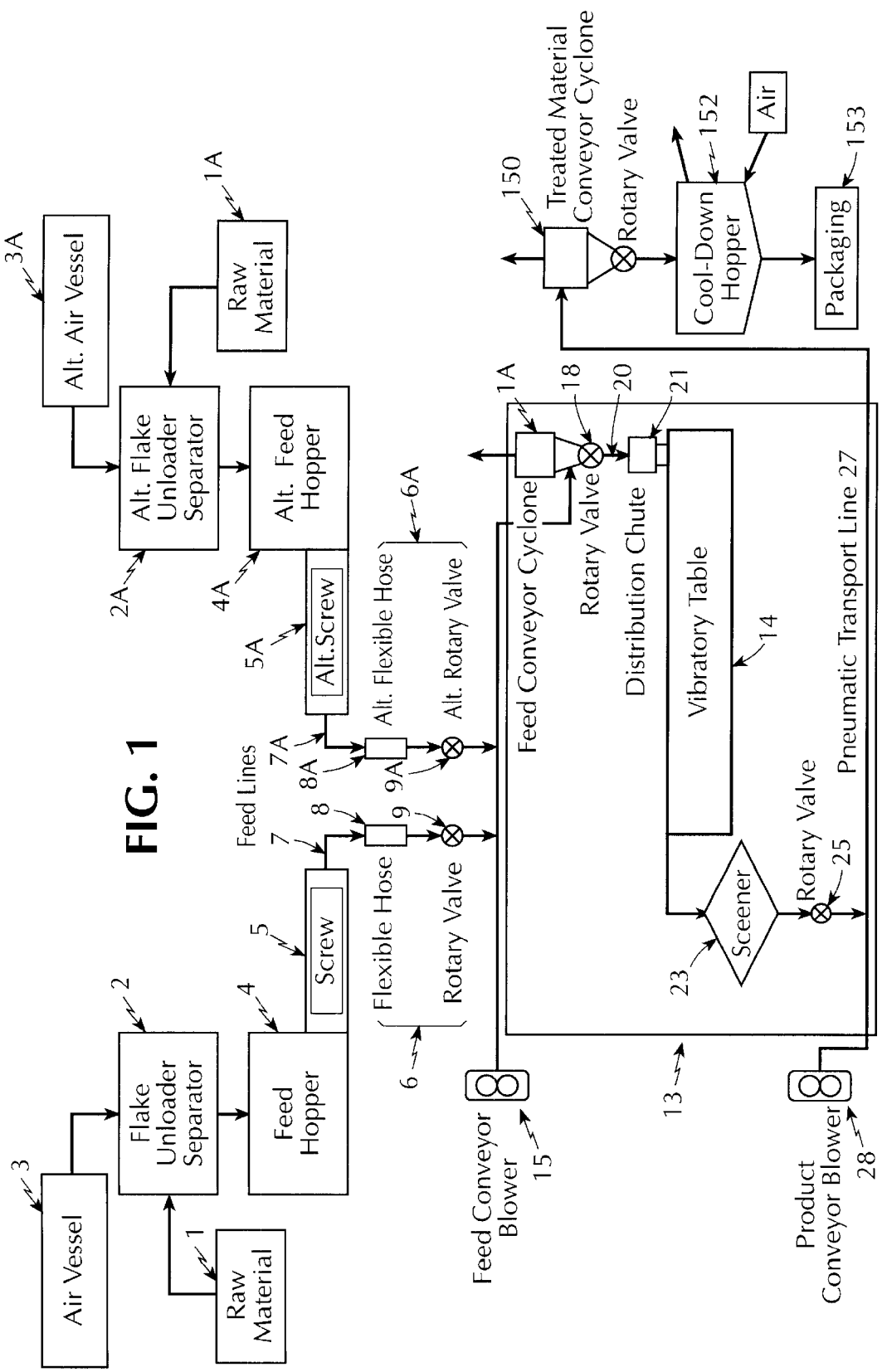
FIG. 1 is a flow diagram of the overall process.

Referring now to FIG. 1 which is flow diagram of the general process; raw material is stored in a packaging 1, which may be a gaylord container. The material is delivered to a flake unloader separator 2 into which air is injected from a vessel 3. The air assists in separating material into particles to alleviate coagulation during transport to the vibratory table and aids in processing. Material is fed by gravity from the flake unloader separator 2 to a feed hopper 4. Material is accumulated in the feed hopper 4 and then transported to a pneumatic transport feed line 7 through a screw conveyor 5 which is attached to the feed hopper 4 at one end and to the pneumatic transport feed line 7 at the other end. The pneumatic transport feed line 7 moves the PTFE under gravity to a rotary plug flow assembly 6. The rotary plug flow assembly 6 comprises a flexible hose 8 attached at one end to the pneumatic transport feed line 7 and at its other end to a plug flow rotary valve 9. Electrical power to the plug flow rotary valve 9 causes rotation of the valve to allow material to enter the pneumatic transport line 11 without allowing the transport medium, which may be air or a combination of oxygen and nitrogen, to escape. Additional product supply apparatus can be attached to the pneumatic transport feed line 11 which additional product supply line comprises a flake unloader separator, feed hopper and screw conveyor and other equipment shown in FIG. 1 labeled generally as 1A–9A. The additional product supply apparatus permits the mixing of PTFE and another material, such as another polymer, so that reaction, reactive coating or copolymerization of PTFE and the other material takes place at the vibratory table with the energy provided by the electron beam.

Further referring to FIG. 1, the pneumatic feed line 11 transports material to a feed conveyor cyclone 12. The feed conveyor cyclone 12 may be located within a vault 13 where the vibratory table 14 is located. The pneumatic feed line 11 is part of a pneumatic transport system that would be understood by one skilled in the art. The system comprises a feed conveyor blower 15 which is operated by a power source. The blower 15 forces air, a mixture of nitrogen and air or any other pneumatic fluid through the pneumatic feed line 11. The pneumatic feed line 11 can be an open or closed loop system in that the pneumatic fluid deposits most of the material in the feed conveyer cyclone 12 and the feed conveyor cyclone 12 forces the pneumatic fluid back into a line which returns the transport medium to the feed conveyer blower 15 or, as shown in FIG. 1, expels the pneumatic fluid from the system. A cooling water system (not shown) can be operated to cool the pneumatic fluid before the fluid interacts with the PTFE. The pneumatic transport system may also equipped with a return air filter (not shown) which filters particles before the transport medium is returned to the feed conveyor blower 15.

The feed conveyor cyclone 12 has attached at its bottom a rotary valve 18. Material is forced from the feed conveyor cyclone 12 to the rotary valve 18 at which point the material ceases to be transported by pneumatic means. The rotary valve 18 rotates and force of gravity drops the PTFE through a conduit 20 to the distribution chute 21, which is located within the vault 13. The distribution chute 21 places the material onto the trough (which is shown more particularly in FIGS. 2 and 3) of the vibratory table 14. After the material has been transported the length of the vibratory table 14 by vibratory means and treated, it passes into a screener 23 which is located at the opposite end of the vibratory table 14 from the distribution chute 21. A plug flow rotary valve 25 is attached to the screener 23. The plug flow rotary valve 25, which is operated by an electrical power source, delivers the processed material to a treated material pneumatic line 27 which transports the material to a staging area.

Material may be evaluated at the staging area for further processing or, if processed to specification, packaged. Also, based on control runs, the molecular weight of degraded material based on depth of material on the trough of the vibratory table, radiation dosage, characteristics of the material, and number of passes through the electron beam can be established. In this manner, the number of runs through the process to achieve a desired average molecular weight will be known thereby alleviating need to evaluate material after each process run. Also, the pneumatic transport system will facilitate particle size reduction, in part because of the brittle characteristics of the PTFE through the radiation processing, and, thus, parameters for particle size reduction as a function of passes through the apparatus may also be developed.

Again referring to FIG. 1, the pneumatic system for transporting processed material from the area of the vibratory table 14 is similar to the pneumatic system used to deliver PTFE to the feed conveyor cyclone 12. Air, a mixture of nitrogen and air or any other pneumatic fluid capable of transporting fluropolymer can be used as the transport medium and charged into the treated material pneumatic transport line 27 where it is forced by a product conveyor blower 28 through the line. The pneumatic fluid can then be cooled in line by a cooling system (not shown) after which it interacts with the treated PTFE transporting the PTFE to a packaging/staging area. The pneumatic fluid can then return to the conveyer blower 28 after being filtered to remove any PTFE particles that may remain mixed with the transport medium or, after filtering, the pneumatic fluid may be expelled from the system.

The pneumatic transport line 27 moves the treated PTFE to treated-material conveyor cyclone 150. A rotary valve 151 is attached to the bottom of the cyclone 150 which removes the treated material to a cool down hopper 152 where the treated material is cooled by forced air blown through the hopper. The treated PTFE, after cooling, is placed into packaging, 153, if the desired average molecular weight is achieved. If the material is not degraded to specification the material can be processed through the apparatus until the desired degree of degradation is achieved, after which it is then placed into packaging 153. The apparatus may also be equipped with a means to comminute the PTFE after radiation processing to achieve a desired particle size, such as pulverizing by one or more mills or micronizing by one or more jet mills.

Figure 1A:
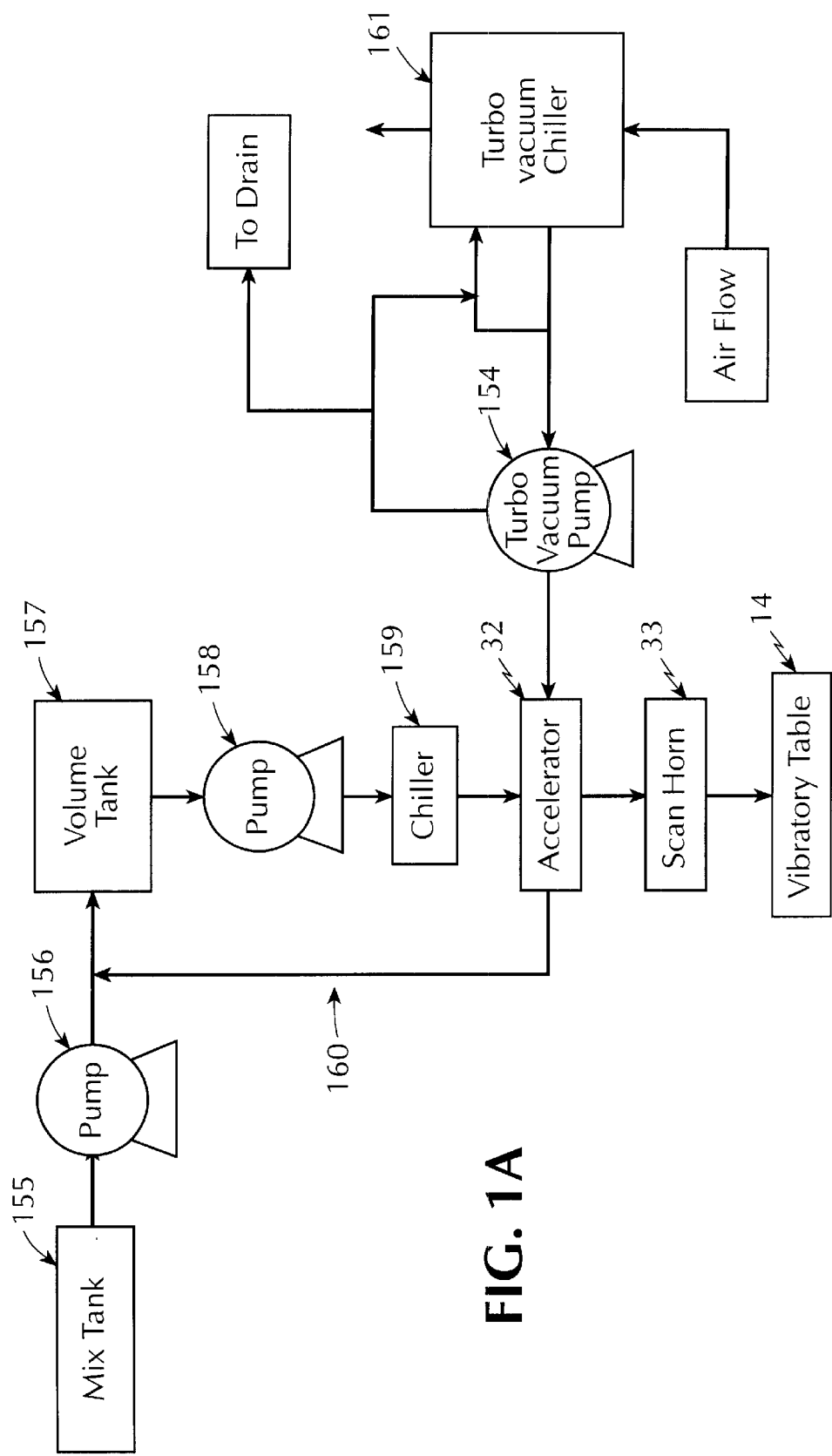
FIG. 1A is a flow diagram of the means for generating an electron beam and dedicated cooling systems.
Figure 2:
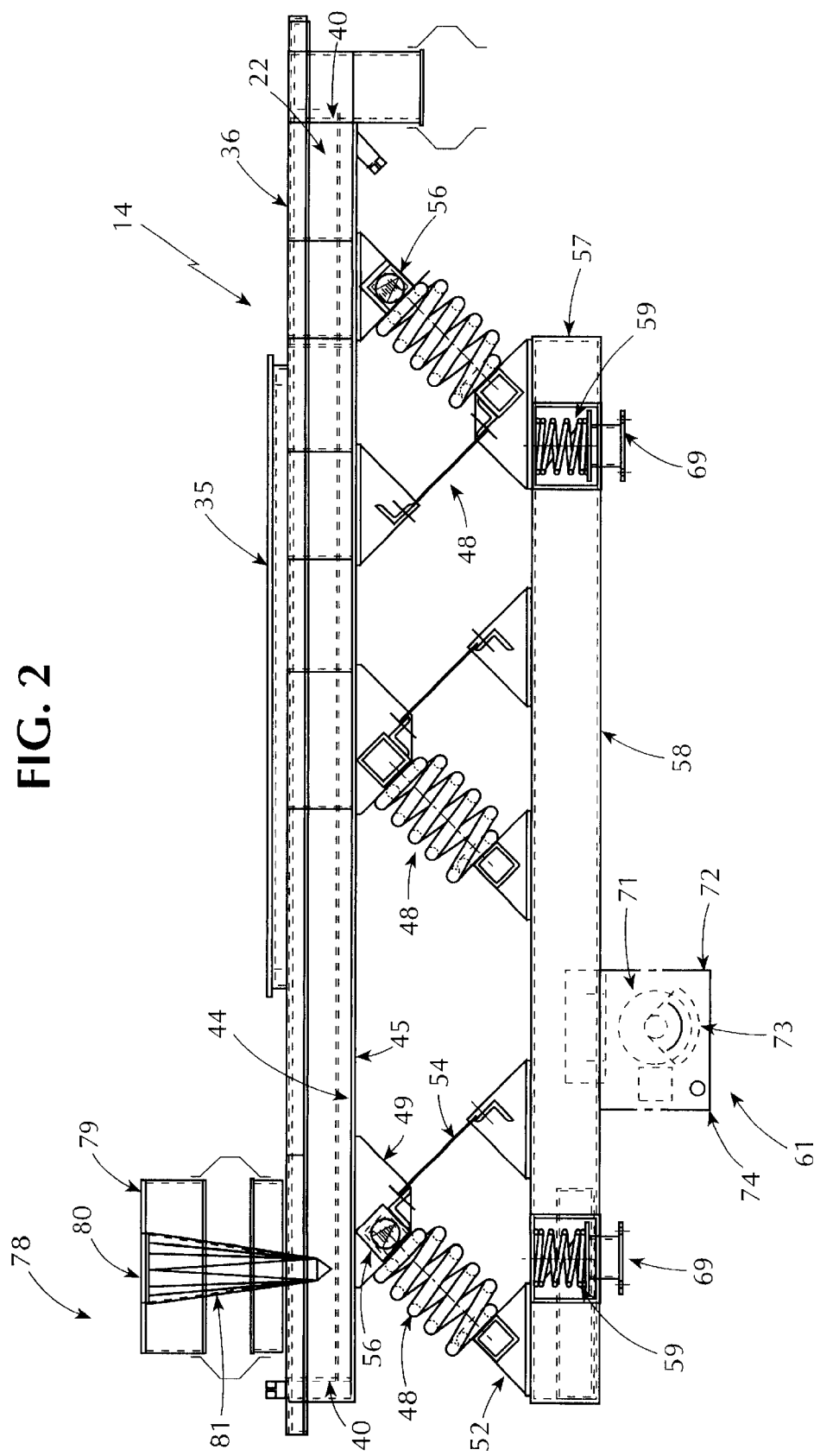
FIG. 2 is a side view elevation of the vibratory table.
Figure 7:
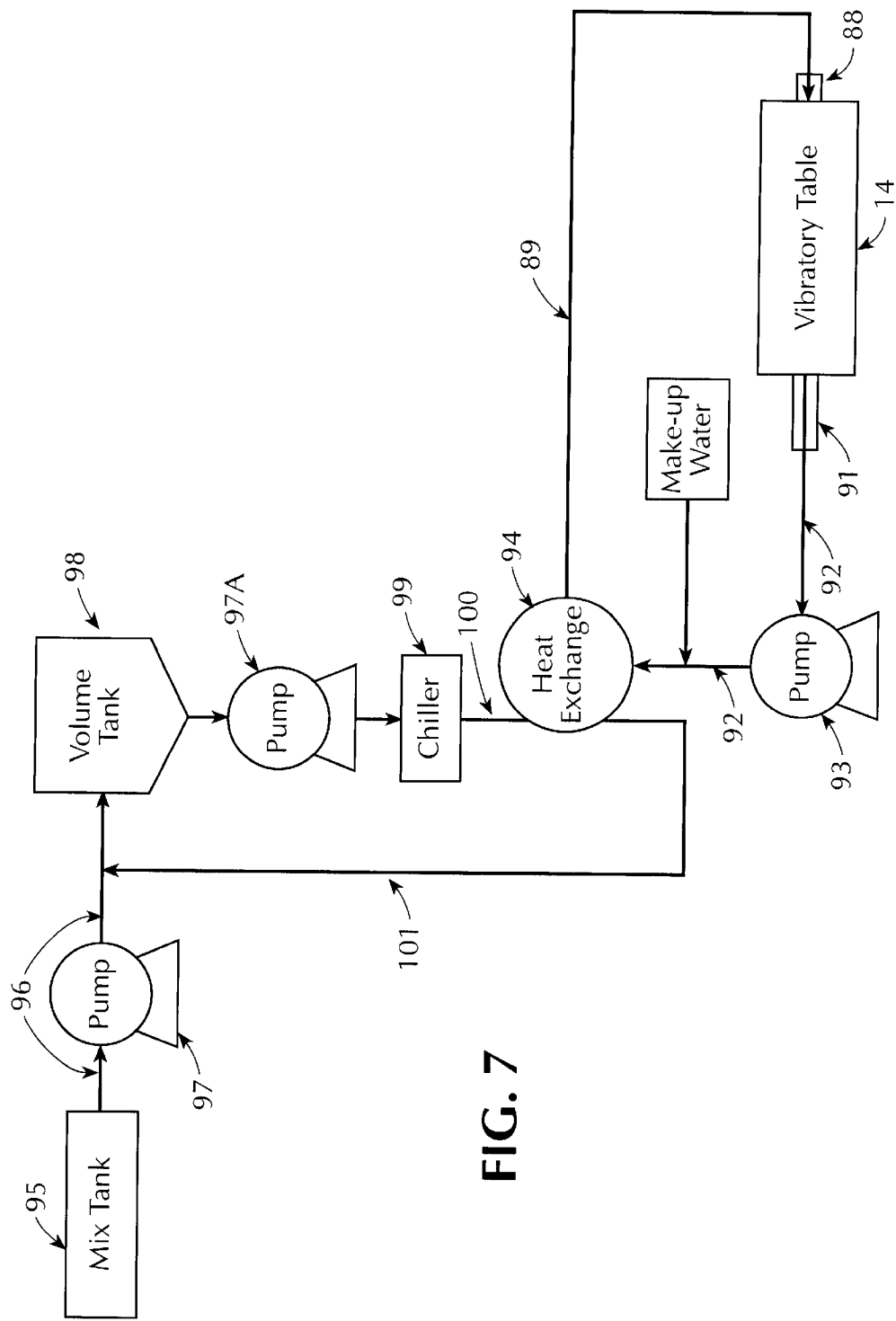
FIG. 7 is a flow diagram of the dual loop cooling water system for the vibratory table.

Referring to now FIGS. 1A and 4, which show a means for an electron beam to be directed to the trough of the vibratory table, a means for generating an electron beam which may be a particle accelerator 32, is located outside of the vault 13. The electron beam is then directed through a scan horn 33, through the vault 13 to a window 35 which is located within the vault 13 and above the trough of the vibratory table 14 attached, at an aperture, to a cover 36 that is attached to the vibratory table 14. The electron beam scans the window 35. Radiation energy moves through the window 35. The means for generating on electron beam may be equipped with a turbo vacuum pump 154 which creates a vacuum for the electron beam. The window may comprise a single titanium sheet, or can comprise a plurality of titanium sheets and PVC material may be wrapped around opposite ends of the titanium sheet or plurality of titanium sheets, such that a portion of the outer side of the single titanium sheet or a portion of the outer side of the top and bottom titanium sheet are exposed to the electron beam. The window is rectangular shaped, and can be about 5 feet in length and about ½ inch in width, however, the dimensions of the window will vary depending on the size of the vibratory table. The means for generating an electron beam and turbo vacuum pump 154 may also be equipped with a cooling water system, as depicted in FIG. 1A. The window may also equipped with a cooling water system. As depicted in FIGS. 2 and 7, the vibratory table is also equipped with a cooling water system.

More detailed description of the various aspects of the process and the apparatus will be discussed in greater detail below, with reference to additional figures.

Referring now to FIGS. 2 and 3, there is shown the vibratory table 14 used for radiation treatment of materials, including the degradation of PTFE. The table 14 comprises a trough 22 which has a bottom 38 in the shape of a rectangle with two side edges 39 and two end edges 40. Two sides 41 protrude upwardly at an angle, preferably obtuse, from each side edge 39, and flanges 42 protrude from each side 41. Preferably, the trough 22, including the bottom 38, sides 41 and flanges 42, is a continuous sheet of stainless steel and has a thickness at the bottom 38 and sides 41 of about 0.08 inches to about 0.37 inches, preferably about 0.125 inches thick. The bottom 38, sides 41 and flanges 42 of the trough 22, however, can be separate pieces welded together. The upper surface of the trough, that is the side which interacts with material, is highly polished, which may be up to about a 240 grit polish, which facilitates material movement along the trough, contributes to providing an even layer of material on the trough 22 and in particular under the election beam and aids in the removal of heat, thermal energy, from the processed material.

Referring to FIGS. 2, 3 and 4 a cover 36 is affixed to the flanges 42 by means such as fasteners, for example nuts and bolts, or being welded to the flanges 42, or any combination thereof. The cover 36 is a continuous piece of metal, preferably stainless steel, with an aperture 43 which is an opening defined by the edges of a rectangle at the approximate mid-point of the cover 36 and extending angularly across the cover 36 to each side edge of the cover 36 to accommodate the scan horn of the particle accelerator. A window 35 for the electron beam is affixed by means such as a fastener, for example nuts and bolts, or being welded to the cover 36, or any combination thereof and situated so that the window is positioned directly above the aperture 43. The window 35 is in the shape of a rectangle about 5 feet long and about ½ inches in width. The window 35 may be of any material that does not significantly resist transmission of the electron beam. The window may comprise at least one titanium sheet and PVC material and can further comprise a stainless steel plate which interfaces with the cover 36. The window can comprise a single titanium sheet with PVC material wrapped around the opposite ends of the titanium sheet. The PVC material serves to minimize damage to the ends of the titanium sheets. Two, two inch silicone gaskets frame the titanium sheet on the bottom plate and top plate. In one embodiment, a full-face gasket is located on top of the two inch silicone gaskets. The stainless steel plate can be secured to the cover 36 by a variety of means including gaskets, frames, welds or any other means or combination of means, to secure the window 35 to the cover 36 while maintaining a seal for the enclosed environment. There is provided a means for sealing the cover 36 to the flange 42 of the vibratory table 12. Such means may be accomplished by welding the components together or by a gasket made of resilient material positioned between and interfacing with the cover 36 and the flanges 42, or any combination of such means.

Again, referring to FIGS. 1A and 4, the means for generating an electron beam produces an electron beam which is then directed through the scan horn 33 to window 35 and scans the window 35. The electron beam is transferred through the window 35 at the aperture 43 in the cover 36. The electron beam degrades the molecular weight of the material that is being moved along the trough 22, that is it reduces the molecular weight of the PTFE by breaking the molecular chain of the polymer. The average molecular weight of the finished product is a function of the depth of material on the trough, the radiation dose, molecular weight and/or size of the starting material and number of passes under the electron beam.

When more than one polymer is moved under the electron beam on the vibratory table the energy can be used to react the polymers, copolymerize the material or modify the material, such as cross-linking. Also, the energy can be used to react polymer such as PTFE with gaseous material, permitted to enter the enclosed environment formed at the trough of the vibratory table by the sealed cover 36 and window 35, and defined by the cavity that is formed by the trough 22, sealed cover 36 and window 35.

Referring to FIGS. 2 and 3, a cooling water jacket 44 is affixed to the underside of the trough 22. The cooling water jacket 44 comprises a base 45 and openings or channels 46 which are defined by a plurality of separators 47 which extend vertically upward from the base 45 of the cooling water jacket 44 to the underside of the trough 22. The separators are either affixed to the base 45, preferably by welding, or are formed as part of the base 45. The upper edges of the separators 47 are in contact with the underside of the trough 22 and may fastened to the trough 22 by any suitable means, preferably by welding the top of the separators 47 to the underside of the trough 22. Alternatively, the cooling water jacket 44 may be fastened to the trough at the flanges 42 in which case, the upper edges of the separators 47 are in contact with but not attached to the underside of the trough 22. The operation and workings of the cooling water jacket 44 will be discussed below.

Referring now to FIGS. 2 and 5, a plurality of drive spring assemblies 48 are affixed to the underside of the base 45 of the cooling water jacket 44. In the embodiment of the invention shown in FIG. 2, three drive spring assemblies 48 are used, however, the total number of assemblies will depend on the dimensions and characteristics of the table. As shown in FIG. 2, and more particularly in FIG. 5, the drive spring assemblies 48 comprise a plurality of upper drive brackets 49 which may be made of a resilient material, such as metal or molded polymer; a plurality of drive spring clamps 50; a plurality of drive springs 51; a plurality of lower drive brackets 52; a plurality of spring keepers 53; a plurality of stabilizer springs 54; a plurality of stabilizer brackets 55 and at least one output gauge 56. As shown in FIG. 5, the drive springs 51 are affixed to the upper drive brackets 49 by means of drive spring clamps 50. The end of the drive springs 51 opposite to that attached to the upper drive brackets 49 are attached to a lower drive brackets 52 by means of drive spring clamps 50. Stabilizer springs 54 may be affixed to upper drive brackets 49 or lower drive brackets 52 by means of spring keepers 53. The stabilizer springs 54 extend outward from the upper drive brackets 49 or lower drive brackets 52 at an angle of about 90° from the plane of the drive spring 51. The end of the stabilizer spring 52 opposite to that affixed to the upper drive brackets 49 or lower drive brackets 52 are affixed to stabilizer brackets 55 by a spring keeper 53.

The drive spring assemblies 48 may be affixed to the underside of the base 45 of the cooling water jacket 44 in one of two orientations. As shown in FIG. 2, the upper drive brackets 49 may be fastened to the underside of the base 45 of the cooling water jacket 44, in which case the stabilizer spring 54 protrudes downward from the upper drive brackets 49 at an angle of about 90° from the plane of the drive spring 51. The lower drive brackets 52 and stabilizer brackets 55, however, may be fastened to the underside of the base 45 of the cooling water jacket 44 in which case the stabilizer springs 54 protrudes upward from the lower drive brackets 52 at an angle of about 90° from the plane of the drive spring 51. In each embodiment, there is provided means to fasten the upper drive brackets 49 to the underside of the base 45 and the lower drive brackets 52 and stabilizer brackets 55 to the underside of the base 45, which means may be a fastener such as a nut and bolt or welding, or any combination thereof.

An output gauge 56 may be fastened to upper drive brackets 49 or lower drive brackets 52 provided that the output gauges are positioned on a member affixed to the underside of the base 45 of the cooling water jacket 44. The output gauge 56 is generally fastened by a machine screw or a nut and bolt. The output gauge measures the force being exerted on the vibratory table.

As shown in FIG. 3, the width of each drive spring assembly 48 is about the width of the vibrating table. Each separate drive spring assembly 48 comprises one upper drive bracket 49, one lower drive bracket 52 and one stabilizer bracket 55. Each drive spring assembly 48 further comprises at least one drive spring drive 51, at least two drive spring clamps 50, at least one stabilizer spring 54, at least two spring keepers 53. In a preferred embodiment, each drive spring assembly 48 comprises one upper drive bracket 49, one lower drive bracket 52 and one stabilizer bracket 55, with three drive springs 51 interspaced spaced between the upper drive bracket 49 and lower drive bracket 52, each drive spring 51 is fastened at each end to the upper drive bracket 49 and lower drive bracket 52, respectively by drive spring clamps 50 such that each drive spring assembly 48 comprises 6 drive spring clamps 50. Four stabilizer springs 54 are interspaced spaced between the upper drive bracket 49 and stabilizer bracket 55, each stabilizer spring 54 fastened at each end to the brackets by a spring keeper 53 such that each drive spring assembly 48 comprises 8 spring keepers 53. In a further preferred embodiment, as shown in FIG. 2 three of these preferred assemblies are fastened to the underside of the base 45 of the cooling water jacket 44 with two of the assemblies oriented in a sequential fashion so that the upper drive brackets 49 are fastened to the underside of the base 45 with the third assembly having the lower drive bracket 52 secured to the underside of the base 45 of the cooling water jacket 44, with one output gauge 56 secured to the upper drive bracket 49 at one end of the vibratory table 14 and the other output gauge 56 secured to the lower drive bracket 52 at the other end of the vibratory table 14.

As shown in FIGS. 2 and 3, the vibratory table 14 further comprises a base assembly 57. The base assembly comprises a counter balance 58, isolator springs 59, isolator brackets 60 and a motor assembly 61. The counterbalance is made from steel or composite material and comprises a flat top 62 and a plurality of inner ribs 63 and outer ribs 64 which are fastened to the flat top 62. The inner ribs 63 and outer ribs 64 may be attached to the flat top 62 by any suitable means including welding, fasteners, such as nuts and bolts, adhesives or any combination thereof. Support brackets 66 are fastened to the lower outer side of the inner ribs 63. Isolator brackets 60 are fastened, by means such as nuts and bolts or welds, or any combination thereof, to the outer surface of each outer rib 64 oriented at about a 90° angle from the flat top 62. The isolator brackets 60 protrude perpendicularly with respect to the outer surface of the outer ribs 64 to accommodate isolator springs 59. The isolator springs 59 dampen vibrations from a motor assembly that are directed away from the trough 22 to prevent damage to the equipment and inhibits and/or prevents movement of the vibratory table 14 along the floor and/or base during operation. The isolator springs 59 are between the isolator bracket 60 and feet 69. The isolator springs 59 are secured by physical means or welding, to the isolator bracket 60 at one end and the feet 69 at the other end. The feet 69 can be secured to the floor by means such as bolts, adhesives or welds, or any combination thereof.

Referring to FIG. 2, the vibratory table 14 is equipped with a motor assembly 61 which comprises an input motor 71, and input motor bracket 72, an eccentric weight 73 and eccentric weight cover guard 74. A source for electrical power is also provided for the input motor 71. The input motor 71 is operated by a power source, generally electrical power. The input motor 71 is secured to the input motor bracket 72 by means of a fastener (e.g nut and bolt) or a weld, or any combination thereof, and the input motor bracket 72 is secured to at least one inner rib 63 by means of a fastener (e.g nut and bolt) or a weld, or any combination thereof. The eccentric weight 73 may be crescent or irregularly shaped and may be a metallic piece. A rod extending from and affixed to the input motor is affixed at its opposite end to the eccentric weight 73. The input motor 71, input motor bracket 72, and eccentric weight 73 are enclosed within the eccentric weight cover guard 74.

Activation of the input motor 71 causes the eccentric weight 73 to rotate in a clockwise direction. As will be apparent to one skilled in the art, the irregular (e.g. not evenly balanced such as square or round) shape of the weight creates an energy pulse during movement which is transferred to the drive springs 51 through the counter balance 58. The energy pulses cause the drive springs 51 to oscillate and this energy is then transferred to the trough 22 which causes material to vibrate on the trough and move in a forward direction. As the material moves along the trough to the area of the window for the electron beam, the material moves under the electron beam and is exposed to the radiation energy and treated, i.e. is degraded, that is the molecular weight is reduced. The material moves on the trough of the vibratory table at about an even depth.

Referring now to FIG. 2A, there is a means 155 for injecting gas to the vibratory table 14 so that the environment within the enclosed space defined by the cavity formed by the trough 22, cover 36 and window 35 can be controlled. This can be accomplished by an input gas nipple made of any non-porous material, such as rubber or nylon. The nipple may be attached to the chute 78. A pressurized vessel or cannister of gaseous chemical can be removably affixed to the nipple 155, by any appropriate means, such as a thread fitting and a conduit between the vessel or cannister may also be provided. The vessel or cannister is removably affixed so that it can be replaced with a similar vessel or cannister having the same or different material. The nipple 155 may be equipped with a valve to open and close the nipple so that the method for treating polymeric materials such as PTFE can be practiced with or without altering the environment at the vibratory table by the introduction of gaseous materials. The controlled environment however permits selected gaseous environments at the trough 22 depending on the type and nature of the gaseous material in the vessel or cannister which allows for control of the environment in which the material is being treated and also to allow for reaction between the gaseous material and PTFE using the energy of the electron beam. When the processing occurs without specific control of the environment, such as when ambient air is permitted to enter the enclosed space, the air is dried by means that would be familiar to one skilled in the art, and the dried air both facilitates material degradation and inhibits condensation.

Figure 6C:
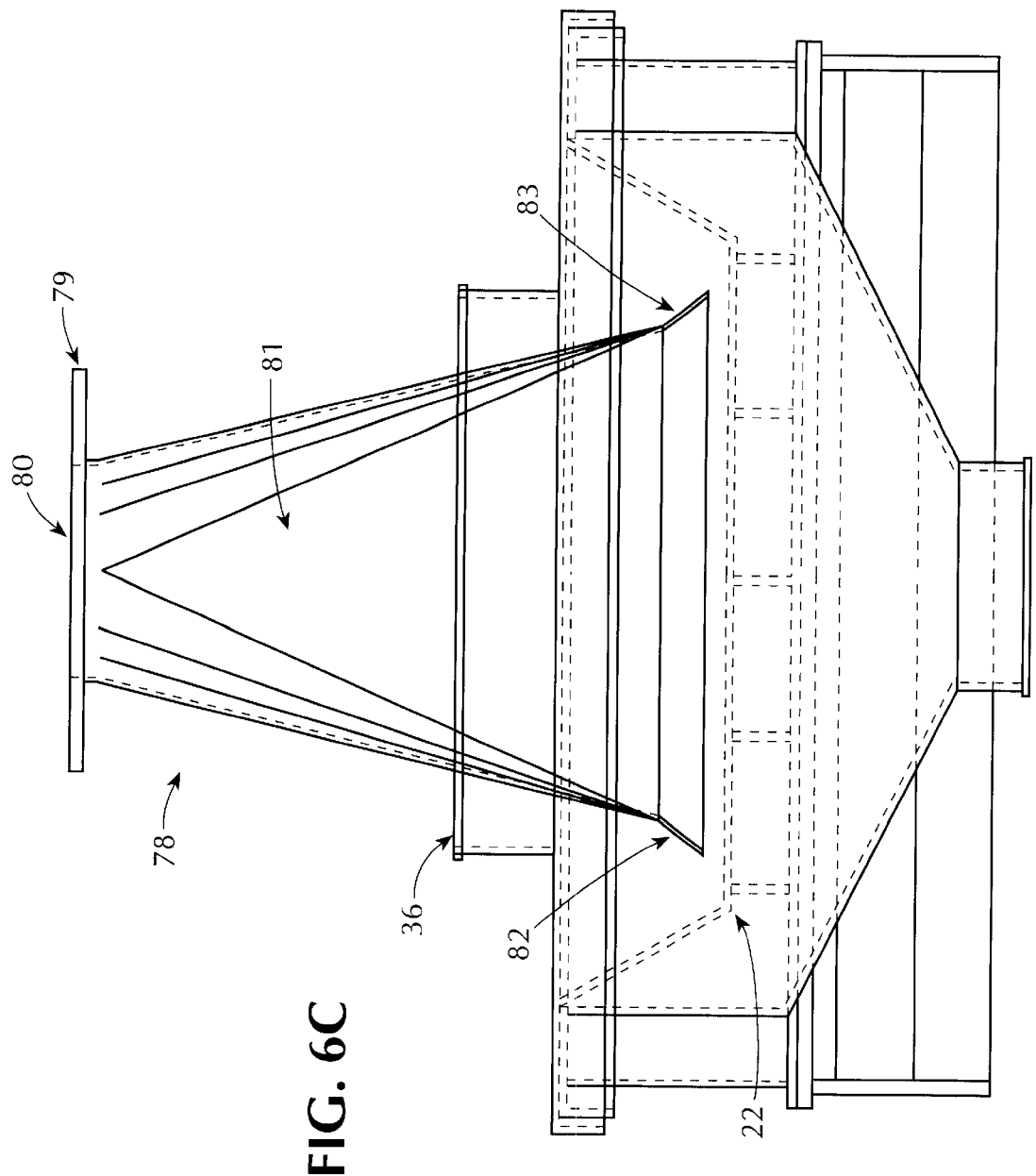
FIG. 6C is a drawing showing the distribution chute in relation to the vibratory table.

Now referring to FIGS. 2, 6 and 6A which illustrate the distribution chute that delivers the material, preferably PTFE, at an even depth on the table. The distribution chute 78 is a hollow open conical shaped element in the shape of a cone bisected in half, which may be made of any material of structural integrity such as sheet metal, steel, aluminum, polymeric material, composite material or combinations thereof. The distribution chute comprises an upper opening 79 which is half circular in shape and is defined by a hollow half circle upper rim 80 of up to about 6 inches in inner diameter, an open hollow conical section 81 that has an open annular space defined by an inner diameter, which extends outward from the upper rim with an increasing inner diameter to a half circle bottom opening 82 which is hollow and defined by an inner diameter that is greater than the inner diameter of the upper rim and about the size of the width of the trough 22 but does not exceed the width of the trough 22 of the vibratory table. Attached to the bottom opening 82 is a recessed flap 83 which can be made of the same material as the hollow conical section 81. The distribution chute comprises an internal directing plate 175 which can be adjusted to equalize the flow across the vibratory table. The distribution chute distributes the polymer, such as PTFE, across the trough of the vibratory table and serves to buffer, that is compensate for, the pulsating flow that may be received from the rotary valve that delivers the polymer to the distribution chute. The chute serves to distribute the polymer, such as PTFE, on the trough in an even layer for processing and provides continuous flow of material to the trough of the vibratory table. Material enters the distribution chute at the upper opening 79 and moves under gravity downward through the annular space of the open conical section and over the internal directing plate 175, and is placed on the trough of the vibratory table 22 at an even depth by moving under gravitational force from the bottom opening 82 of the distribution chute 78 through the flap 83 and to the trough 22. The distribution chute is positioned above one end of the table and is perpendicular to the trough. The internal directing plate 175 is moveable and can be positioned to facilitate movement of PTFE in the distribution chute, and to facilitate distribution of an even layer of material on the trough.

Now referring to FIGS. 3 and 7. FIG. 7 depicts a dual loop cooling system that removes heat from the degraded PTFE at the point of treatment and while the treated material moves along the trough 22 of the vibratory table 14. The vibratory table, as shown in FIG. 3, is equipped with a cooling water jacket 44 on the underside of the trough 22 which, as shown in FIG. 3, is comprised of a series of openings or channels 46 defined by a plurality of separators 47 which extend vertically upward from the base 45 of the cooling water jacket 44 to the underside of the trough 22. Water flows within the channels 46 in a direction opposite to the direction of material movement on the trough 22. The channels serve to assure that water is continuously in contact with the entire underside of the trough 22 during processing, this includes contact with both the underside of the bottom 38 and sides 41 of the trough. Such contact may also be facilitated by positioning the vibratory table at a slight upward angle of repose with reference to the point where cooling water enters the cooling water jacket 47. If cooling water is not in contact with the underside of the trough during operation, effective heat transfer of the thermal energy created by the electron beam treatment will not occur which could cause damage to equipment and, possibly, structural failure of the trough 22.

Referring now to FIGS. 2, 3 and 7, cooling water enters the channels 47 through an input flexible hose 88 that is attached at one end to a conduit 89 and at the other end to the channels 46 at the end of the vibratory table 14 where treated material leaves the vibratory table. The cooling water flows through the channels 46 at a rate of between about 15 gpm and about 25 gpm at a pressure between about 5 psi and about 7 psi. The flow rates and pressure are necessary to allow the water to remain in contact with the underside of the vibratory table 14 while not causing damage to or failure of the trough. The temperature of the water entering the channels 46 is about 55° F. to about 65° F. which is pertinent for appropriate heat transfer and retards condensation at the trough of the vibratory table.

As the water flows within each channel 46, thermal energy is transferred from the PTFE through the trough 22 thus cooling the PTFE and heating the cooling water. Heat transfer is facilitated by the trough 22 which is relatively thin and made of steel and thus, does not provide significant resistance to heat transfer from the PTFE to the cooling water. The separators 47 provide structural rigidity to the trough and cooling water jacket and define the channels 46 that direct or distribute cooling water across the width of the underside of the vibratory table to alleviate air pockets and heat sinks. Water distribution beneath the entire underside of the vibratory table protects the table from damage from the heat generated by the radiation processing. The separators 47 also facilitate heat transfer by effectively increasing the surface area in contact with the water. Heat transfer is also facilitated by the flow characteristics of the water within the channels 46. Because the table vibrates, the water within each channel 46 exhibits turbulent flow patterns which provides increased heat transfer rates compared to water flowing between about 15 gpm and about 25 gpm without any vibratory action.

As shown in FIG. 7, water exits the channels at the opposite side of the vibratory table 14 from which the water entered the channels through an export flexible hose 91 which is attached and secured to a conduit 92 which transports the heated water by a circulating pump 93 to a heat exchanger 94. The circulating pump maintains constant flow of water within the cooling water system so that the flow rate within the channels is between about 15 gpm and about 25 gpm at about 5 psi to about 7 psi. Thermal energy is removed from the cooling water in the heat exchanger 94, and the water exits the heat exchanger 94 at a temperature of between about 55° F. to about 65° F. After leaving the heat exchanger, the cooling water is returned to the input flexible hose 88 through the conduit 89. All of the various conduits and pieces of equipment (e.g. circulating pump, heat exchanger and flexible pipes) are connected together and secured to prevent leakage by means such as thread fittings, soldered fittings, welds, gaskets or any combination thereof. A valve and fitting may also be provided in the conduit line near the circulating pump to provide water, such as "make up water", to replace any water lost from the system during operation and to initially charge the cooling water system during start-up periods.

The heat exchanger 94 is equipped to circulate a heat transfer fluid in conduits separate and independent from the conduits that circulate the cooling water to the vibratory table. Any fluid capable of removing heat from the cooling water is acceptable for use as the heat transfer fluid, however, a mixture of about 20% to about 40% ethylene glycol and about 60% to about 80% water, and preferably a mixture of about 30% ethylene glycol and about 70% water, will effectively remove heat from the cooling water so that the temperature of the cooling water leaving the heat exchanger is from about 55° F. to about 65° F. and can be circulated at the pressure and flow rate requirements of the vibratory table adapted for radiation treatment of polymeric materials.

As shown in FIG. 7 ethylene glycol and water are mixed in a tank 95 and then transported by a conduit 96 through a circulating pump 97 to a volume tank 98. The ethylene glycol/water mixture may also be mixed in line with ethylene glycol/water mixtures that are used to cool other apparatus. In one embodiment, the ethylene/glycol water mixture returning form the heat exchanger 94 is mixed in line with ethylene glycol and water that has been used for cooling the electron beam window and the means for generating an electron beam.

Again referring to FIG. 7, a circulating pump 97A transports the ethylene glycol/water mixture from the volume tank 98 through a chiller 99 where the mixture is cooled to a temperature of from about 33° F. to about 40° F., preferably about 38° F. The pressure generated by the pump 97A moves the ethylene glycol/water mixture through the chiller 99 and, by conduit 100 to the heat exchanger 94. After the ethylene glycol/water mixture exits the heat exchanger 94, the mixture moves through a conduit 101 and returns to the volume tank 98. The ethylene glycol/water mixture exits the heat exchanger 94 at a temperature of about 50° F. to about 70° F.

The cooling water system for the vibratory table is a dual system. The first system or loop using cooling water, removes heat from the material treated at the table, and the second system or loop removes heat from the cooling water. The first loop and second loop are independent systems, such that there is no physical mixing or direct contact between the cooling media in each respective loop. Thermal energy is transferred from the cooling water of the first loop to the cooling medium of the second loop in the heat exchanger 94. Because of the pressure requirements of the table, it was unexpectedly discovered that the dual loop system was needed to remove the significant heat generated by the radiation treatment. The pressure requirements precluded the use of ethylene glycol directly at the table.

Figure 8:
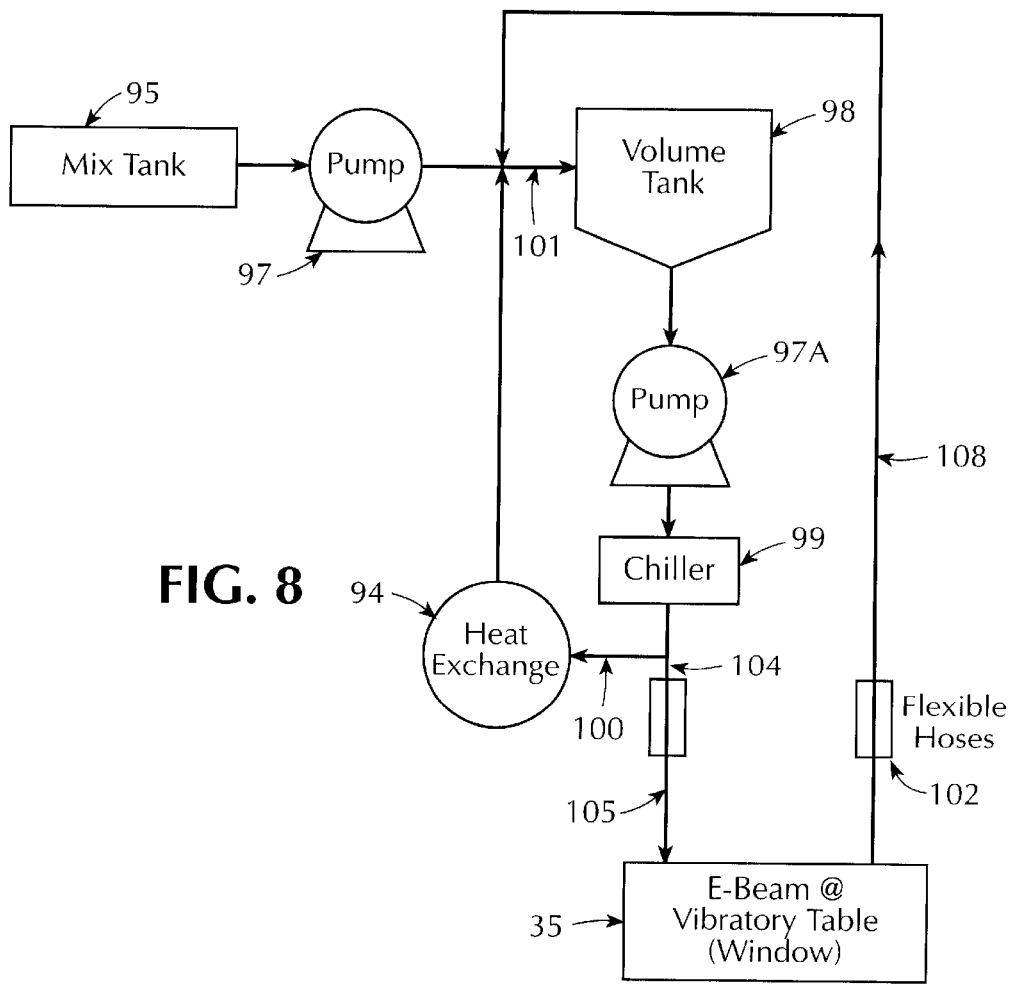
FIG. 8 is a flow diagram of a cooling water system for the electron beam window.

A cooling water system may also be provided for the electron beam window. Heat transfer fluid, such as an ethylene glycol and water mixture, can be circulated between a chiller and the electron beam window to remove heat. In a preferred embodiment as shown in FIG. 8, however, the heat transfer fluid, e.g. ethylene glycol and water, from the volume tank 98 is pumped to the chiller 99 through the same pump 97A and conduit 100 used for the ethylene glycol/water mixture loop of the cooling water system for the vibratory table. Referring to FIG. 8, interspaced between the chiller 99 and heat exchanger 94 is a conduit 104 which bisects the conduit 100 used for the cooling water system for the vibratory table which transports the ethylene glycol/water mixture to a window input flexible hose 105. The window input flexible hose 105 is attached to piping or a jacket (not shown) which is in contact with the window 35. The window input flexible tube 105 may be attached to the piping by any appropriate means to seal the components so that the mixture will not leak such as thread fittings or soldered fittings or any combination thereof. The opposite end of the piping is attached to an output window flexible hose 107 which is attached to a conduit 108, both by means to prevent leakage, such as threaded fittings and soldered fittings or any combination thereof. The ethylene glycol/water mixture is then returned to the volume tank 98 through a conduit 108 which bisects the conduit 101 used for the dual loop cooling system for the vibratory table that returns the ethylene glycol/water mixture from the heat exchanger. Through this system, the ethylene glycol/water mixture circulates through the chiller 99 where heat is removed and then by the electron beam window 35 where the heat transfer medium is heated by withdrawing thermal energy from the electron beam window.

The means used for generating the electron beam can be equipped with two separate cooing systems. One embodiment, which would be understood by one skilled in the art, is illustrated in FIG. 1A. In this embodiment, the particle accelerator 32 and turbo vacuum pump 154 are cooled by separate systems. In the system for the accelerator 32, heat transfer media, such as ethylene glycol and water, is mixed in a mix tank 155, and is transported through conduits by a pump 156 to a volume tank 157. The heat transfer media is then transported by conduits by pump 158 from the volume tank 157 to a chiller 159 and then to the accelerator where heat is removed by exchange of thermal energy to the chilled heat transfer fluid. Conduit 160 transports the fluid from the accelerator to other conduits and then to the volume tank 157. In the cooling system for the turbo vacuum pump 154, heat transfer fluid, such as ethylene glycol and water, is circulated by conduit between the turbo vacuum pump 154 and a turbo vacuum chiller 161. Any fluid capable of removing heat is acceptable for use as the cooling medium for both the accelerator and turbo vacuum pump, including a mixture of about 20% to about 40% ethylene glycol and about 60% to about 80% water, preferably about 30% ethylene glycol and about 70% water.

Figure 9:
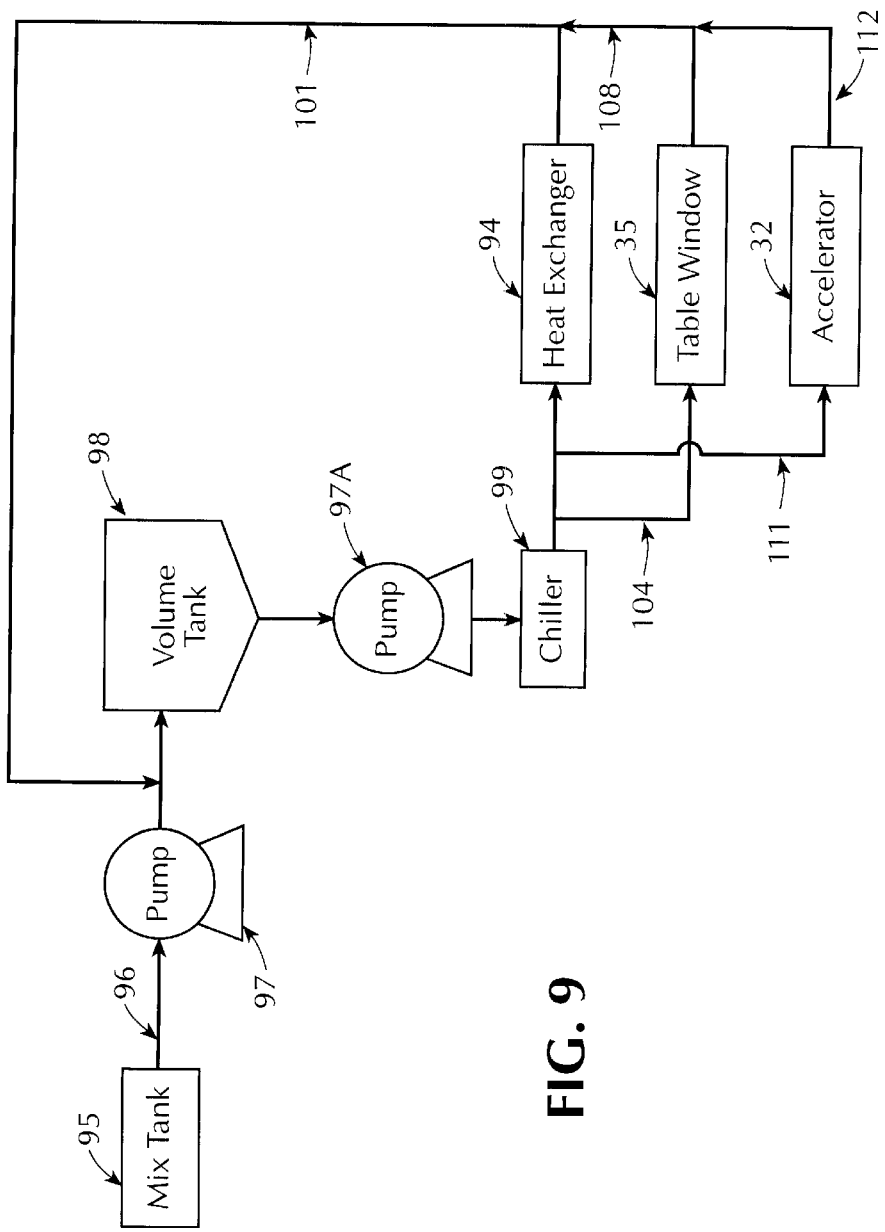
FIG. 9 is a flow diagram of an embodiment of the cooling water system for the electron beam window where the heat transfer medium is cooled in a chiller also used for other apparatus, including the vibratory table and particle accelerator.

In another embodiment as shown in FIG. 9, the volume tank, pumps, chiller and heat transfer fluid used for the cooling systems for the electron beam window and vibratory table, can be used for the accelerator vessel. A pipe 111 may bisect the conduit that delivers the heat transfer fluid, such as an ethylene glycol/water mixture, from the chiller 99 to the heat exchanger 94 thus diverting some of the mixture to the accelerator vessel 32. The heat transfer fluid is moved through a conduit 111 in contact with the accelerator vessel 32 and then returned to the volume tank 98 through a conduit 112 that bisects the conduit moving the heat transfer medium from the electron beam window 35 to the volume tank 98. In all embodiments, the accelerator vessel may be equipped with a cooling jacket.

It will be readily apparent to one skilled in the art that the process for radiation treatment of material, such as PTFE, on a vibratory table, which comprises several interrelated process and apparatuses requires process controls. These controls are operated throughout the various processes that comprise the method. The controls are monitored, activated and deactivated by one or more central control stations which can include one or more microprocessors. Also, the process involves environmental controls, such as air pollution controls, to prevent the escape of particulate matter as should be understood by one skilled in the art.

In the preferred embodiment of the invention, PTFE is transported to a flake unloader separator and then into a feed hopper. The material is then transported by a screw conveyor through a flexible hose into a rotary valve which moves the PTFE into a pneumatic transport line. The PTFE is moved by pneumatic means in a conduit to a cyclone and then through a rotary valve. The rotary valve moves the PTFE into the distribution chute. The distribution chute distributes the PTFE onto the trough of the vibratory table in an even layer, as discussed above. The vibratory action of the table moves the even layer of PTFE along the trough and under the electron beam at the location of the window, where the molecular weight of the PTFE is degraded. After treatment, the PTFE continues to move along the trough due to the vibratory action of the table and is dropped into a screener from which the degraded PTFE is transported to a packaging area through a pneumatic transport line.

The method reduces the molecular weight of the PTFE and, because pneumatic transport is used in this preferred embodiment, also reduces the particle size of the material. Generally, the material, such as PTFE, can be moved along the vibratory table at a rate of about 5 to about 20 feet per minute at an even, a consistent, thickness of about ⅛ inch to ½ inch. The table can move up to 5,000 pounds of material per hour, preferably up to 2,500 pounds of material per hour. Radiation dosage of about 2 Mrads to about 10 Mrads are available to treat the PTFE at a beam voltage of up to 1.5

MeV with amperage settings of about 5 to about 40 milliamps, which correspond to the about 2 to about 10 Mrads available dosage. When a pneumatic system is used to transport the material to and from the vibratory table, the particular size of the PTFE can be reduced to a size of about 100 microns to about 3,000 microns in one cycle. If particle sizes less than about 100 microns are desired, that is sizes between about 30 microns and about 100 microns, additional passes through the apparatus are necessary. Thus, when pneumatic treatment is used, the method can provide PTFE, or other polymeric materials, with degraded molecular weight and particle sizes of about 30 microns to about 3,000 microns without additional comminution of the degraded PTFE.

EXAMPLES

Four boxes of PTFE from Ausimont USA, Inc., Thorofare, N.J., USA were degraded using the vibratory table using the same radiation dosage to confirm the effectiveness of the table and the consistency of the molecular weight of the polymer. An electron beam degrades the molecular chain of a polymer thereby reducing the molecular weight. The molecular weight of a polymer effects the melting profile of the polymer. Thus, if a polymer degraded using the vibratory table apparatus exhibits a consistent melt profile, the polymer has a consistent molecular weight. Consistency of the molecular weight indicates that an even electron beam exposure is occurring at the vibratory table. This would demonstrate that the polymer, in these Examples, PTFE, is being moved on the table at an even depth with little or no over-radiation or uneven radiation treatment as experienced with apparatus and systems in the art. Further, consistent molecular weight would demonstrate that the polymer is not experiencing the negative side effects associated with cooling systems employed with other systems known in the art.

A Differential Scanning Calorimeter ("DSC") available from TA Instruments, Inc., New Castle, Del., USA, was used to characterize the melting profile of the PTFE treated on the vibratory table apparatus. When a polymer, such as the treated PTFE melts, the polymer absorbs a characteristic amount of heat, or energy, from its environment which converts the polymer from a solid physical state to a liquid physical state. The DSC was used to impart heat to a sample of PTFE of known weight while attempting to maintain a constant energy output as measured in Watts. As the polymer melts and absorbs more energy, the DSC must increase energy output to maintain the desired constant energy output. The change in energy output by the DSC can be plotted as a function of temperature to establish characteristic melting profile of the polymer.

Figure 10:
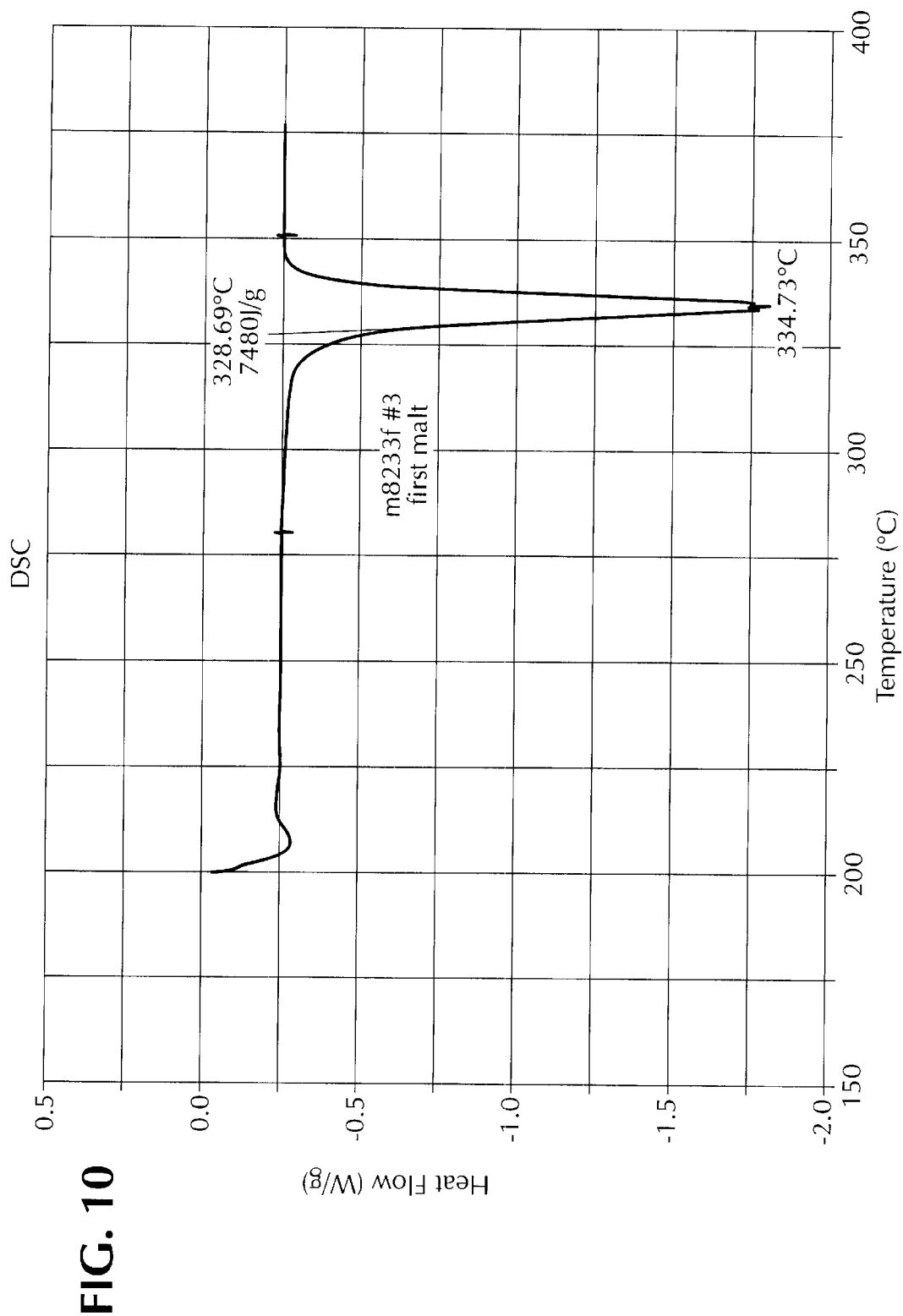
FIGS. 10 to 13 are graphs depicting the results of differential scanning calorimetry of samples of PTFE degraded by movement under an election beam on the adapted vibratory table.
Figure 11:
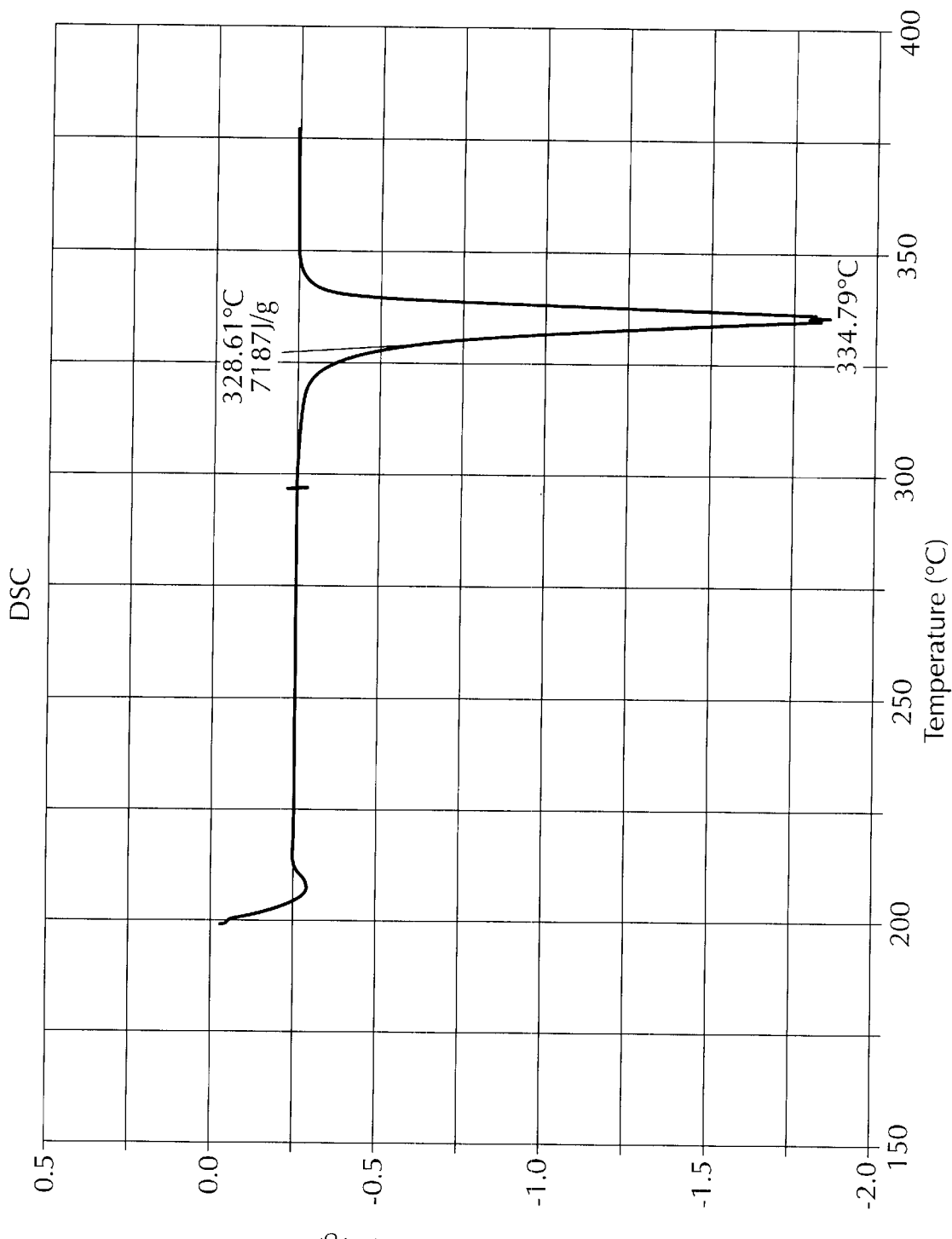
Figure 12:
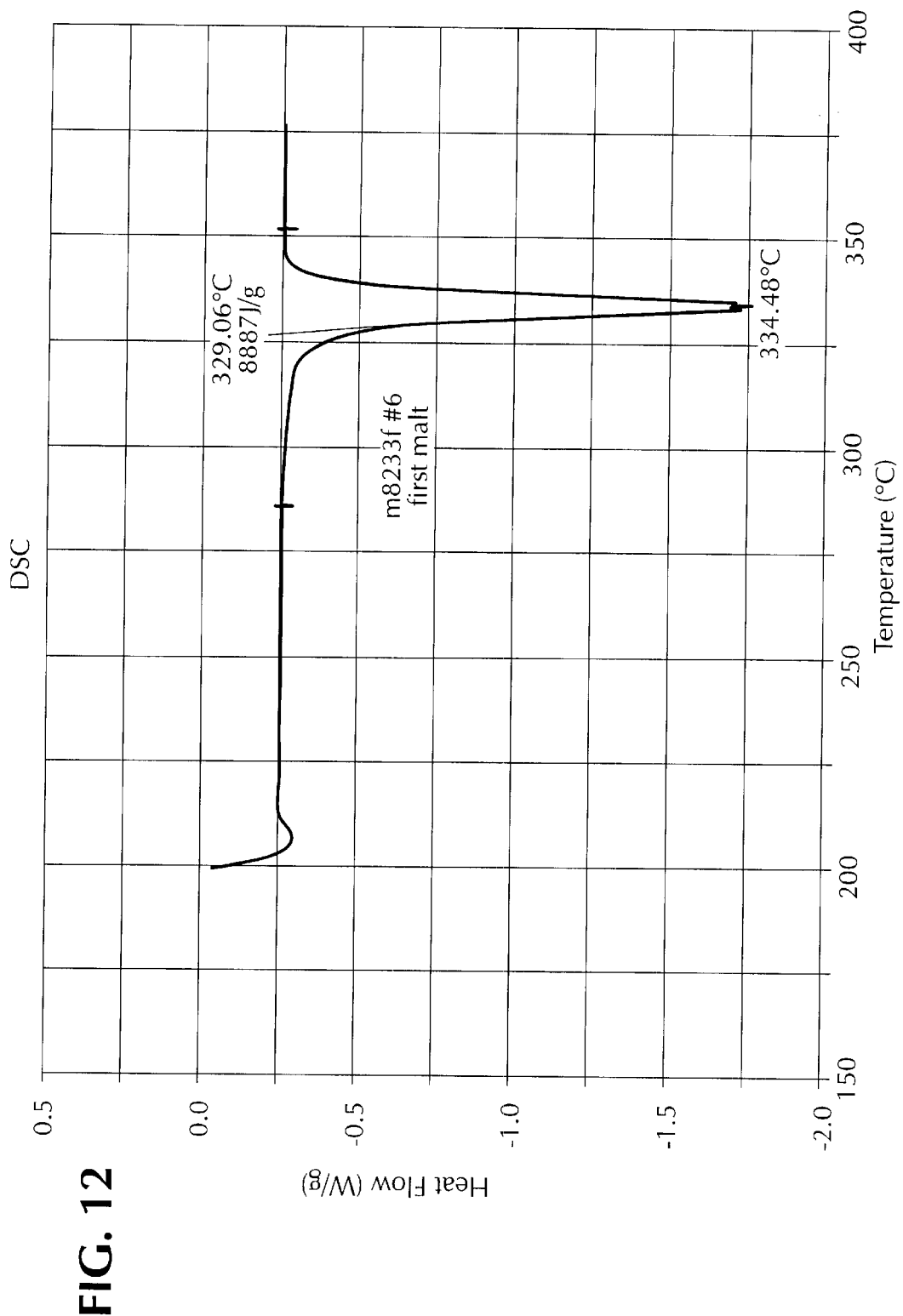
Figure 13:
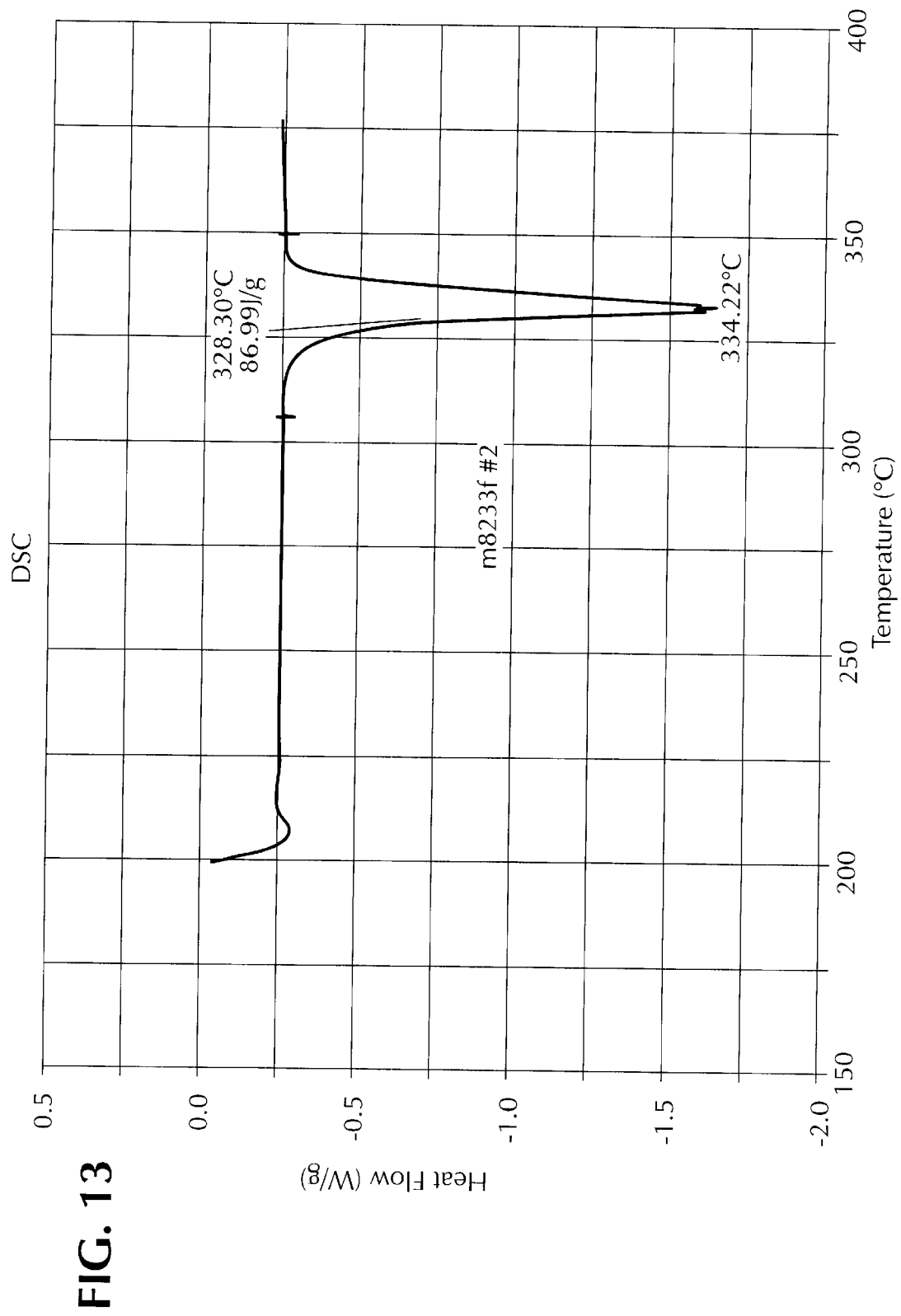

FIGS. 10–13 are charts showing the DSC curve (Heat Flow (energy output) as a function of temperature) for four samples of PTFE treated by radiation at the vibratory table apparatus. Each sample was obtained from separate runs on the table. Four boxes of PTFE were subjected to a single pass on the table under the electron beam at the same radiation dose. Sample of known weights of 14.33 milligrams (mg), 14.35 mg, 17.14 mg and 15.92 mg were analyzed using the DSC. One sample from each treated box was analyzed. The DSC results show a very consistent melt profile comparing all samples. The physical representation of absorption appears as a large dip in the curves of FIGS. 10–13. FIG. 10 pertains to the 15.92 mg sample, FIG. 11 pertains to the 14.33 mg sample, FIG. 12 pertains to the 14.35 mg sample and FIG. 13 pertains to the 17.14 mg sample. The melt points of the samples range from about 334.2° C. to 334.8° C., which reflects a variation of less than 0.2% (numerical percent). This demonstrates that the samples have consistent molecular weights thus indicating even depth of material on the table and even treatment for each box of PTFE.

What is claimed is:

1. An apparatus for radiation treatment of polymeric materials comprising:

a) a vibratory table comprising a trough upon which said polymeric material is conveyed at a consistent thickness of about ⅛ inch to about ½ inch under an electron beam, said trough comprising a bottom and sides extending from said bottom and flanges extending from said sides, said trough made from stainless steel and having an upper surface and lower surface with the upper surface of said trough having a high polish-finish;

b) a cover attached to said flanges with a means for sealing said cover to said flanges so that an enclosed environment is formed within a cavity defined by said trough and said cover, said cover having an aperture in the shape of a rectangle, the center of said aperture being located at about the center of said cover, said aperture capable of accommodating an electron beam window;

c) a means for generating an electron beam and an electron beam window, said window being attached to said cover at the location of said aperture with means for sealing said window to said cover and having means for directing the electron beam from said means for generating an electron beam to said window;

d) a distribution chute for distributing polymeric material onto the trough of said vibratory table at the consistent thickness said distribution chute comprising an upper opening having a half circular shape defined by a hollow half circle upper rim, an open hollow conical section, a half circle bottom opening, a recessed flap, and an internal directing plate which can be adjusted to equalize the flow across the vibratory table, said open hollow conical section extending outward from said upper rim with an increasing inner diameter to said half circle bottom opening which is hollow and defined by an inner diameter that is greater than the inner diameter of the upper rim and about the size of the width of said trough and said recessed flap is attached to said half circle bottom opening wherein said polymeric material enters said distribution chute at the upper opening and moves under gravity downward through the annular space of the open conical section and over the internal directing plate and is placed on the trough of the vibratory table by moving under gravitational force from the half circle bottom opening through the recessed flap;

e) a means for cooling said polymeric material; and f) a means for vibrating said trough.

2. The apparatus of claim 1 further comprising means for introducing gaseous material into said enclosed environment defined by the cavity formed by said trough and said cover.

3. The apparatus of claim 1 further comprising a feed conveyor cyclone, a plug flow rotary valve and a pneumatic conveyance system having a pneumatic feed line and a plurality of flake unloader separators capable of storing and aerating different polymeric materials each having means for conveying material to the same pneumatic transport line wherein the pneumatic feed line transports the polymeric material to the feed conveyor cyclone and the polymeric material is forced to the plug flow rotary valve which rotates permitting the polymeric material to drop by the force of gravity to the distribution chute.

4. The apparatus of claim 1 wherein said polymeric material is polytetrafluoroethylene.

5. The apparatus of claim 1 wherein said means for vibrating said trough comprises at least one drive spring assembly, a base assembly, a motor assembly and a power source.

6. The apparatus of claim 1 wherein said vibratory table conveys up to about 2,500 pounds of polymeric material per hour.

7. The apparatus of claim 1 wherein said polymeric material is conveyed in said trough at a rate of between about 5 to about 20 feet per minute.

8. The apparatus of claim 1 wherein said means for generating an electron beam comprises a particle accelerator capable of producing a radiation dose of about 2 megarads to about 10 megarads at a setting of about 1.5 MeV with amperage of about 5 milliamps to about 40 milliamps, and said means for directing the electron beam comprises a scan horn.

9. The apparatus of claim 1 further comprising a pneumatic system for transporting processed polymeric material from the vibratory table.

10. The apparatus of claim 1 wherein said means for cooling polymeric material is a dual loop cooling water system comprising:
   a) a cooling jacket capable of accommodating fluid positioned beneath said trough, said cooling jacket comprising a bottom and channels formed by a plurality of separators extending vertically from said bottom to the underside of said trough;
   b) a first loop comprising a conduit attached to a means to distribute said fluid to said channels, a conduit for removing said fluid from said channels, a heat exchanger and a circulating pump; and
   c) a second loop system comprising a mix tank for heat transfer media at least one circulating pump, conduits, said heat exchanger and a chiller, wherein said first loop and said second loop are independent systems.

11. The apparatus of claim 10 wherein said heat transfer media is a mixture of ethylene glycol and water.

12. The apparatus of claim 10 wherein said fluid is water.

13. The apparatus of claim 12 wherein said water is circulated at rate of about 15 gallons per minute to about 25 gallons per minute at a pressure of about 5 pounds per square inch to about 7 pounds per square inch at the vibratory table.

14. A method for radiation treatment of polymeric material comprising:
   providing a vibratory table comprising a trough for conveying said polymeric material under an electron beam at a consistent thickness of about ⅛ inch to about ½ inch whereby the molecular weight of said polymeric material is degraded by radiation energy of said electron beam said trough having a bottom, sides and flanges with a cover attached to the trough with means for providing a seal between said trough and said cover so that an enclosed environment defined by the cavity between the cover and said trough is provided, said cover comprising an aperture in the shape of a rectangle, the center of said aperture being located at about the center of said cover, a window, means for cooling said polymeric material during and after treatment, at least one drive spring assembly, a base assembly, a motor assembly and a power source;
   providing a means for generating the electron beam and a means for directing said electron beam to said window, said window attached to said cover within said aperture with means providing for a seal between said window and said cover; and
   providing a distribution chute for distributing polymeric material onto the trough of said vibratory table at the consistent thickness said distribution chute comprising an upper opening having a half circular shape defined by a hollow half circle upper rim, an open hollow conical section, a half circle bottom opening, a recessed flap, and an internal directing plate which can be adjusted to equalize the flow across the vibratory table, said open hollow conical section extending outward from said upper rim with an increasing inner diameter to said half circle bottom opening which is hollow and defined by an inner diameter that is greater than the inner diameter of the upper rim and about the size of the width of said trough and said recessed flap is attached to said half circle bottom opening wherein said polymeric material enters said distribution chute at the upper opening and moves under gravity downward through the annular space of the open conical section and over the internal directing plate and is placed on the trough of the vibratory table by moving under gravitational force from the half circle bottom opening through the recessed flap.

15. The method of claim 14 further comprising providing means for introducing gaseous material into said enclosed environment.

16. The method of claim 14 wherein said power source is electrical power.

17. The method of claim 14 wherein said polymeric material is polytetrafluoroethylene.

18. The method of claim 14 wherein up to about 2,500 pounds of said polymeric material per hour is conveyed in said trough of said vibratory table.

19. The method of claim 14 wherein said polymeric material is conveyed in said trough at said vibratory table at a rate of between about 5 to about 20 feet per minute.

20. The method of claim 14 wherein said means for generating an electron beam comprises a particle accelerator capable of producing a radiation dose of about 2 megarads to about 10 megarads at a setting of about 1.5 MeV with amperage of about 5 milliamps to about 40 milliamps, and said means for directing the electron beam is a scan horn.

21. the method of claim 14 further comprising providing a pneumatic system for transporting processed polymeric material from the vibratory table.

22. The method of claim 14 further comprising providing means for conveying polymeric material to said distribution chute by pneumatic transport media, said means for conveying material comprising a feed conveyor cyclone, a plug flow rotary valve and a plurality of flake unloader separators capable of storing and aerating different polymeric materials, each having means for conveying polymeric material to the same pneumatic transport line where the pneumatic feed line transports the polymeric material to the feed conveyor cyclone and the polymeric material is forced to the plug flow rotary valve which rotates permitting the polymeric material to drop by the force of gravity to the distribution chute.

23. The method of claim 22 wherein the particle size of said polymeric material is reduced to a size of about 30 microns to about 3,000 microns.

24. The method of claim 14 wherein said means to cool said polymeric material comprises:
   a) cooling jacket capable of accommodating fluid positioned beneath said trough, said cooling jacket comprising a bottom and channels formed by a plurality of separators extending vertically from said bottom to the underside of said trough;

b) a first loop comprising a conduit attached to a means to distribute said fluid to said channels, a conduit for removing said fluid from said channels, a heat exchanger and a circulating pump; and c) a second loop system comprising a mix tank for heat transfer fluid, at least one circulating pump, conduits, said heat exchanger and a chiller, wherein said first loop and said second loop are independent systems.

25. The method of claim 24 wherein said fluid is water.

26. The method of claim 25 wherein said water is circulated at a rate of about 15 gallons per minute to about 25 gallons per minute at a pressure of about 5 pounds per square inch to about 7 pounds per square inch at the vibratory table.

27. The method of claim 24 wherein said heat transfer media is a mixture of ethylene glycol and water.

* * * * *